(12) United States Patent  (10) Patent No.: US 7,427,448 B2
Ito et al.  (45) Date of Patent: Sep. 23, 2008

(54) PORTABLE DEVICE, CASE FOR PORTABLE DEVICE, AND FUEL CELL STRUCTURE

(75) Inventors: Yoshihiro Ito, Saitama-ken (JP); Nobuaki Nagou, Saitama-ken (JP); Tsuneo Sato, Saitama-ken (JP); Seimei Ushiro, Saitama-ken (JP); Masanoshin Komori, Saitama-ken (JP); Yasuhiro Miwa, Saitama-ken (JP)

(73) Assignees: FUJIFILM Corporation, Tokyo (JP); FUJINON Corporation, Saitama (JP)

( * ) Notice: Subject to any disclaimer, the term of this patent is extended or adjusted under 35 U.S.C. 154(b) by 365 days.

(21) Appl. No.: 10/940,768

(22) Filed: Sep. 15, 2004

(65) Prior Publication Data

US 2005/0064264 A1 Mar. 24, 2005

(30) Foreign Application Priority Data

Sep. 19, 2003 (JP) ............................. 2003-328792
Feb. 9, 2004 (JP) ............................. 2004-031905

(51) Int. Cl.
*H01M 2/00* (2006.01)
(52) U.S. Cl. ............................. 429/12; 429/13; 429/34; 429/38; 429/40
(58) Field of Classification Search ................... 429/12, 429/13, 34, 38, 40
See application file for complete search history.

(56) References Cited

U.S. PATENT DOCUMENTS

| 6,268,077 B1 * | 7/2001 | Kelley et al. ................... 429/33 |
| 6,649,298 B2 | 11/2003 | Hayashi et al. |
| 2003/0096642 A1 * | 5/2003 | Bessa et al. ................... 455/573 |
| 2005/0019639 A1 * | 1/2005 | Nakakubo et al. ............. 429/34 |

FOREIGN PATENT DOCUMENTS

JP 2002-49440 A 2/2002

* cited by examiner

*Primary Examiner*—Jane Rhee
(74) *Attorney, Agent, or Firm*—Sughrue Mion, PLLC

(57) ABSTRACT

A fuel cell is disposed inside a camera housing in the vicinity of a front panel, an upper panel, and a side panel in parallel with the respective panels. The invention provides broader cell area and adequate power can be supplied reliably.

22 Claims, 22 Drawing Sheets

PORTABLE DEVICE, CASE FOR PORTABLE DEVICE, AND FUEL CELL STRUCTURE

CROSS-REFERENCE TO RELATED APPLICATION

This application claims priority under 35 USC 119 from Japanese Patent Application Nos. 2003-328792 and 2004-31905, the disclosures of which are incorporated by reference herein.

BACKGROUND OF THE INVENTION

1. Field of the Invention

The present invention relates to a portable device, a case for portable device, and a fuel cell structure.

2. Description of the Related Art

Conventionally, a device using a fuel cell as a power supply has been devised. As the fuel cell, a fuel cell using an electrochemical reaction for converting the chemical energy, which is generated at the time of bonding of hydrogen and oxygen, into electric energy is sometimes utilized, and, in the fuel cell, since the output voltage per unit cell area is generally constant, the power that can be supplied is determined by a cell area, i.e., an area of a proton conducting film. For example, assuming that the output voltage per unit cell area is 50 mW/$cm^2$, when power is supplied to a device that requires necessary power of 1 W such as a cellular phone, the cell area of 20 $cm^2$ is needed, and, in a device that requires necessary power of 20 W such as a personal computer, the cell area of 400 $cm^2$ is needed.

For example, in Japanese Patent Application Laid-Open (JP-A) No. 2002-49440, a portable information device having a fuel cell and an air chamber provided within a display unit is disclosed, and, in this configuration, the necessary cell area is ensured by disposing the fuel cell panel on the rear surface side of the LCD panel of the personal computer. Accordingly, in a portable device such as a cellular phone and a camera, space for ensuring a sufficient cell area for supplying power from the fuel cell can not be ensured. By equipping these portable device with the fuel cell simply, the portable device is upsized.

SUMMARY OF THE INVENTION

The present invention is achieved in light of the above described fact, and a task thereof is to obtain a portable device and a case for portable device that can be supplied with necessary power from a fuel cell without causing upsizing, and a fuel cell structure that can supply the necessary power to the portable device without causing upsizing.

A first aspect of the invention is to provide a portable device including a fuel cell, the device comprising: a device housing; a proton conducting film disposed in the vicinity of an outer wall of the device housing substantially parallel to the outer wall; catalyst layers disposed on both sides of the proton conducting film in a thickness direction thereof; fuel of the fuel cell disposed on one of the catalyst layer sides of the proton conducting film; and an air chamber disposed on the other of the catalyst layer sides of the proton conducting film for supplying air to the fuel cell.

Note that, in the invention, "substantially in parallel" includes not only the case where the proton conducting film is completely in parallel with the outer wall of the device housing, but, other than this case, for example, also the case where the proton conducting film is slightly slanted relative to the outer wall of the device housing, if only the case is the same as the case where the membrane is substantially disposed in parallel with the outer wall. Furthermore, when the outer wall of the device housing is curved or bent, the case where the proton conducting film is disposed along the outer wall by being bent or curved is included.

In the portable device, the proton conducting film is disposed in the vicinity of the outer wall of the device housing substantially in parallel with the outer wall, and further the catalyst layer and the fuel or the catalyst layer and the air chamber are disposed on both sides of the proton conducting film in the thickness direction, respectively. Therefore, the proton conducting film, the catalyst layers, the fuel, and the air chamber as a whole are disposed along the outer wall of the device housing, and thereby, the broader cell area (the area of the proton conducting film) for supplying the necessary power to the portable device can be ensured. Since the proton conducting film, the catalyst layers, the fuel, and the air chamber are disposed along the outer wall of the device main body, upsizing of the portable device is not caused.

A second aspect of the invention is to provide a portable device including a fuel cell, the device comprising: a device housing; a proton conducting film disposed in the vicinity of an outer wall of the device housing integrally with the outer wall; catalyst layers disposed on both sides of the proton conducting film in a thickness direction thereof; fuel of the fuel cell disposed on one of the catalyst layer sides of the proton conducting film; and an air chamber disposed on the other of the catalyst layer sides of the proton conducting film for supplying air to the fuel cell.

Note that, "integrally" in the invention means only that the proton conducting film of the fuel cell is integrated along with the outer wall of the device housing, and includes, for example, a case where the membrane is integrated with the package constituting the fuel cell by being engaged with the outer wall by an engaging member such as a claw. In this constitution, by just engaging the engaging member, they can be integrated easily. Further, other than this, for example, a part of the fuel cell (the above described package and the like) may be welded to the outer wall of the device housing. They can be completely integrated by welding.

The fuel cell is constituted by including the proton conducting film, and, in the portable device, the proton conducting film is disposed in the vicinity of the outer wall of the device housing integrally with the outer wall. Furthermore, the catalyst layer and the fuel or the catalyst layer and the air chamber are disposed on both sides of the proton conducting film in the thickness direction, respectively. Therefore, the proton conducting film, the catalyst layers, the fuel, and the air chamber as a whole are disposed as a part of the outer wall of the device housing along the outer wall, and thus, the broader cell area (the area of the proton conducting film) for supplying the necessary power to the portable device can thereby be ensured. Since the proton conducting film, the catalyst layers, the fuel, and the air chamber are disposed integrally with the outer wall of the device main body, upsizing of the portable device is not caused.

A third aspect of the invention is to provide a portable device, according to the first or second aspect, wherein the proton conducting film is disposed at least in the vicinity of a bottom surface of the device housing.

Thereby, the portable device can be made smaller.

A fourth aspect of the invention is to provide a portable device, according to any one of the first to third aspects, wherein component parts of the portable device are disposed, and the proton conducting film is disposed at least in an air space produced within the device housing.

In the portable device, the proton conducting film is disposed in the air space (so-called dead space) produced within the device housing and there is no need to provide space for disposing the proton conducting film in the device housing. Thereby, the device housing structure can be simplified and the portable device can be made smaller.

A fifth aspect of the invention is to provide a portable device, according to any one of the first to fourth aspects, wherein the proton conducting film is disposed so as to be folded inside the device housing.

Thereby, the broader cell (the area of the proton conducting film) can be ensured.

A sixth aspect of the invention is to provide a portable device, according to any one of the first to fifth aspects, wherein the air chamber is disposed so as to face the outside of the device housing.

The water produced by the electrochemical reaction in the fuel cell is moved into the air chamber, whereby the water can be discharged efficiently to the outside of the device housing.

A seventh aspect of the invention is to provide a portable device, according to the sixth aspect, wherein, in the device housing, at least a portion located outside of the air chamber is formed by a mesh member.

Therefore, the water produced by the electrochemical reaction in the fuel cell can be discharged reliably to the outside, and air (oxygen) can be allowed to flow in from the outside. Furthermore, foreign materials entering from outside can be prevented.

An eighth aspect of the invention is to provide any one portable device of the first to seventh aspects, wherein the outer wall has a buffer member located between the fuel cell and the outer wall.

Therefore, when an impact acts on the portable device, the impact transmission to the fuel cell is relaxed and the fuel cell can be protected from the impact effectively.

A ninth aspect of the invention is to provide any one portable device of the first to eighth aspects, further comprising a grip portion that can be held by a user, and the proton conducting film is disposed along the grip portion.

Therefore, the fuel cell can be activated by the heat of the portable device user holding the grip portion. Further, the broader cell area (the area of the proton conducting film) for supplying the necessary power to the portable device can be ensured without causing upsizing of the portable device.

A tenth aspect of the invention is to provide any one portable device of the first to ninth aspects, further comprising a lid member that makes a part of the device housing openable and closable, and the proton conducting film is disposed along the lid member.

Therefore, by using the lid member effectively, the fuel cell can be disposed more efficiently. Further, the broader cell area (the area of the proton conducting film) for supplying the necessary power to the portable device can be ensured without causing upsizing of the portable device.

An eleventh aspect of the invention is to provide any one portable device of the first to tenth aspects, further comprising a substrate therein, and at least a part of the proton conducting film is disposed between the outer wall of the device housing and the substrate.

Therefore, by utilizing the space between the outer wall and the substrate effectively, the fuel cell can be disposed more efficiently. Further, the broader cell area (the area of the proton conducting film) for supplying the necessary power to the portable device can be ensured without causing upsizing of the portable device.

A twelfth aspect of the invention is the portable device of the eleventh aspect, wherein the proton conducting film is folded back so as to be disposed along both sides of the substrate.

Thereby, the broader cell area (the area of the proton conducting film) can be ensured.

A thirteenth aspect of the invention is the portable device of the eleventh or twelfth aspect, wherein the substrate is a circuit board constituting auxiliary light emitting portion.

Therefore, the fuel cell can be activated by the heat from the circuit board.

A fourteenth aspect of the invention is to provide a portable device, according to any one of the first to thirteenth aspects, further comprising reaction suppressing portion for suppressing electrochemical reaction in the fuel cell provided in the portable device.

Thereby, excessive electrochemical reaction can be suppressed, and the wasteful fuel consumption can be prevented. Further, in the portable device, generally, a secondary cell for temporarily storing the power from the fuel cell is often provided, and the overcharge of the secondary cell can be prevented.

A fifteenth aspect of the invention is to provide a portable device, according to the fourth aspect, wherein the reaction suppressing portion suppresses the electrochemical reaction by adjusting a voltage applied to the fuel cell.

By such simple constitution, the electrochemical reaction in the fuel cell can be suppressed.

A sixteenth aspect of the invention is to provide a case for a portable device capable of accommodating therein a portable device having a fuel cell as a power source, the case comprising: a case housing; a proton conducting film disposed in the vicinity of a wall body of the case housing substantially parallel to the wall body; catalyst layers disposed on both sides of the proton conducting film in a thickness direction thereof; fuel of the fuel cell disposed on one of the catalyst layer sides of the proton conducting film; and an air chamber disposed on the other of the catalyst layer sides of the proton conducting film for supplying air to the fuel cell.

Note that, in the invention, "substantially in parallel" includes not only the case where the proton conducting film is completely in parallel with the wall body of the case housing, but, other than this case, for example, also the case where the proton conducting film is slightly slanted relative to the wall body of the case housing, if only the case is the same as the case where the membrane is substantially disposed in parallel with the wall body. Furthermore, when the wall body of the case housing is curved or bent, the case where the proton conducting film is disposed along the wall body by being bent or curved is included.

In the case for portable device, the proton conducting film is disposed in the vicinity of the wall body of the device housing substantially in parallel with the wall body, and further, the catalyst layer and the fuel or the catalyst layer and the air chamber are disposed on both sides of the proton conducting film in the thickness direction, respectively. Therefore, the proton conducting film, the catalyst layers, the fuel, and the air chamber as a whole are disposed along the wall body of the case housing, and thereby, the broader cell area (the area of the proton conducting film) for supplying the necessary power to the portable device accommodated in the case for portable device can be ensured. Since the proton conducting film, the catalyst layers, the fuel, and the air chamber are disposed along the outer wall of the device main body, upsizing of the case for portable device is not caused.

A seventeenth aspect of the invention is to provide a case for a portable device capable of accommodating therein a portable device having a fuel cell as a power source, the case comprising: a case housing; a proton conducting film disposed in the vicinity of a wall body of the case housing integrally with the wall body; catalyst layers disposed on both sides of the proton conducting film in a thickness direction thereof; fuel of the fuel cell disposed on one of the catalyst layer sides of the proton conducting film; and an air chamber disposed on the other of the catalyst layer sides of the proton conducting film for supplying air to the fuel cell.

Note that, in the invention, "integrally" means only that the proton conducting film of the fuel cell is integrated along with the wall body of the case housing, and includes, for example, the case where the membrane is integrated with the package constituting the fuel cell by being engaged with the wall body by an engaging member such as a claw. In this constitution, by just engaging the engaging member, they can be integrated easily. Further, other than this, for example, a part of the fuel cell (the above described package and the like) may be welded to the wall body of the case housing. They can be completely integrated by welding.

The fuel cell is constituted by including the proton conducting film, and, in the case for portable device, the proton conducting film is disposed in the vicinity of the wall body of the case housing integrally with the wall body. Furthermore, the catalyst layer and the fuel or the catalyst layer and the air chamber are disposed on both sides of the proton conducting film in the thickness direction, respectively. Therefore, the proton conducting film, the catalyst layers, the fuel, and the air chamber as a whole are disposed as a part of the wall body of the case housing along the wall body, and thereby, the broader cell area (the area of the proton conducting film) for supplying the necessary power to the portable device accommodated in the case for portable device can be ensured. Since the proton conducting film, the catalyst layers, the fuel, and the air chamber are disposed integrally with the wall body of the case housing, upsizing of the case for portable device is not caused.

An eighteenth aspect of the invention is to provide a case for a portable device, according to the sixteenth or seventeenth aspect, wherein the proton conducting film is disposed so as to be folded along the case housing.

Thereby, the broader cell (the area of the proton conducting film) can be ensured.

A nineteenth aspect of the invention is to provide a case for a portable device, according to any one of the sixteenth to eighteenth aspects, wherein the air chamber is disposed so as to face the outside of the case housing.

The water produced by the electrochemical reaction in the fuel cell is moved into the air chamber, whereby the water can be discharged efficiently to the outside of the case housing.

A twentieth aspect of the invention is to provide a case for a portable device, according to the nineteenth aspect, wherein, in the case housing, at least a portion located outside of the air chamber is formed by a mesh member.

Therefore, the water produced by the electrochemical reaction in the fuel cell can be discharged reliably to the outside, and air (oxygen) can be allowed to flow in from the outside. Furthermore, foreign materials entering from outside can be prevented.

A twenty-first aspect of the invention is to provide a case for a portable device, according to any one of the sixteenth to twentieth aspects, wherein the wall body has a buffer member located between the fuel cell and the wall body.

Therefore, when an impact acts on the case for portable device, the impact transmission to the fuel cell is relaxed and the fuel cell can be protected from the impact effectively.

A twenty-second aspect of the invention is to provide a case for a portable device, according to any one of the sixteenth to twenty-first aspects, further comprising reaction suppressing portion for suppressing an electrochemical reaction in the fuel cell provided in the case for a portable device.

Thereby, excessive electrochemical reaction can be suppressed, and the wasteful fuel consumption can be prevented. Further, in the portable device, generally, a secondary cell for storing the power from the fuel cell temporarily is often provided, and the overcharge of the secondary cell can be prevented.

A twenty-third aspect of the invention is to provide a case for portable device, according to the twenty-second aspect, wherein the reaction suppressing portion suppresses the electrochemical reaction by adjusting a voltage applied to the fuel cell.

By such simple constitution, the electrochemical reaction in the fuel cell can be suppressed.

A twenty-fourth aspect of the invention is to provide a fuel cell structure comprising: an adsorption sheet to which fuel is adsorbed; a first catalyst layer disposed in surface contact with the adsorption sheet; a proton conducting film disposed in surface contact with the first catalyst layer on an opposite side of the first catalyst layer from the adsorption sheet; and a second catalyst layer disposed in surface contact with the proton conducting film on an opposite side of the proton conducting film from the first catalyst layer.

Therefore, in the fuel cell structure, the first catalyst layer and the second catalyst layer are disposed on both sides of the proton conducting film in surface contact, and further, the adsorption sheet is disposed in surface contact with the first catalyst layer. Therefore, since the fuel cell structure as a whole takes thin-plate form, the broader cell area can be ensured and great power can be ensured. Thin plate form can be disposed in the dead space of the portable device or the case for portable device, and does not cause upsizing of these.

Since the invention achieves the above described constitution, the necessary power can be supplied from the fuel cell to the portable device without causing upsizing.

DETAILED DESCRIPTION OF THE INVENTION

Figure 1:
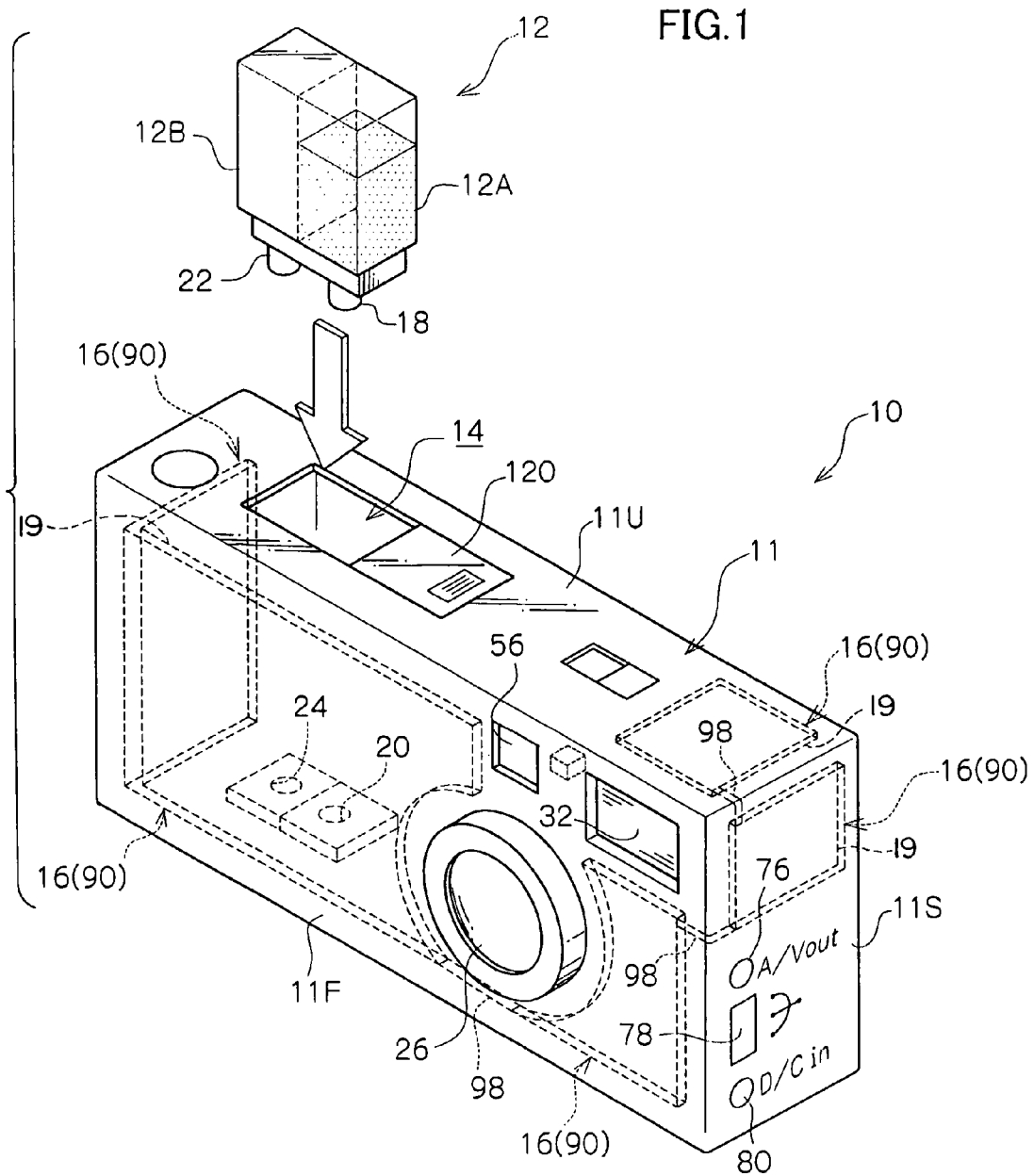
FIG. 1 is a perspective view showing a digital still camera of a first embodiment of the present invention.

In FIG. 1, a digital still camera 10 of a first embodiment of the present invention is shown. In this digital still camera 10, a fuel tank 12, in which a methanol solution ($CH_3OH+H_2O$) is filled, is loaded from above through an opening of a storage portion 14 provided in a camera housing 11 of the digital still camera 10, and the digital still camera 10 is driven by the power generated in a fuel cell 16 with fuel supplied from the fuel tank 12.

Figure 4:
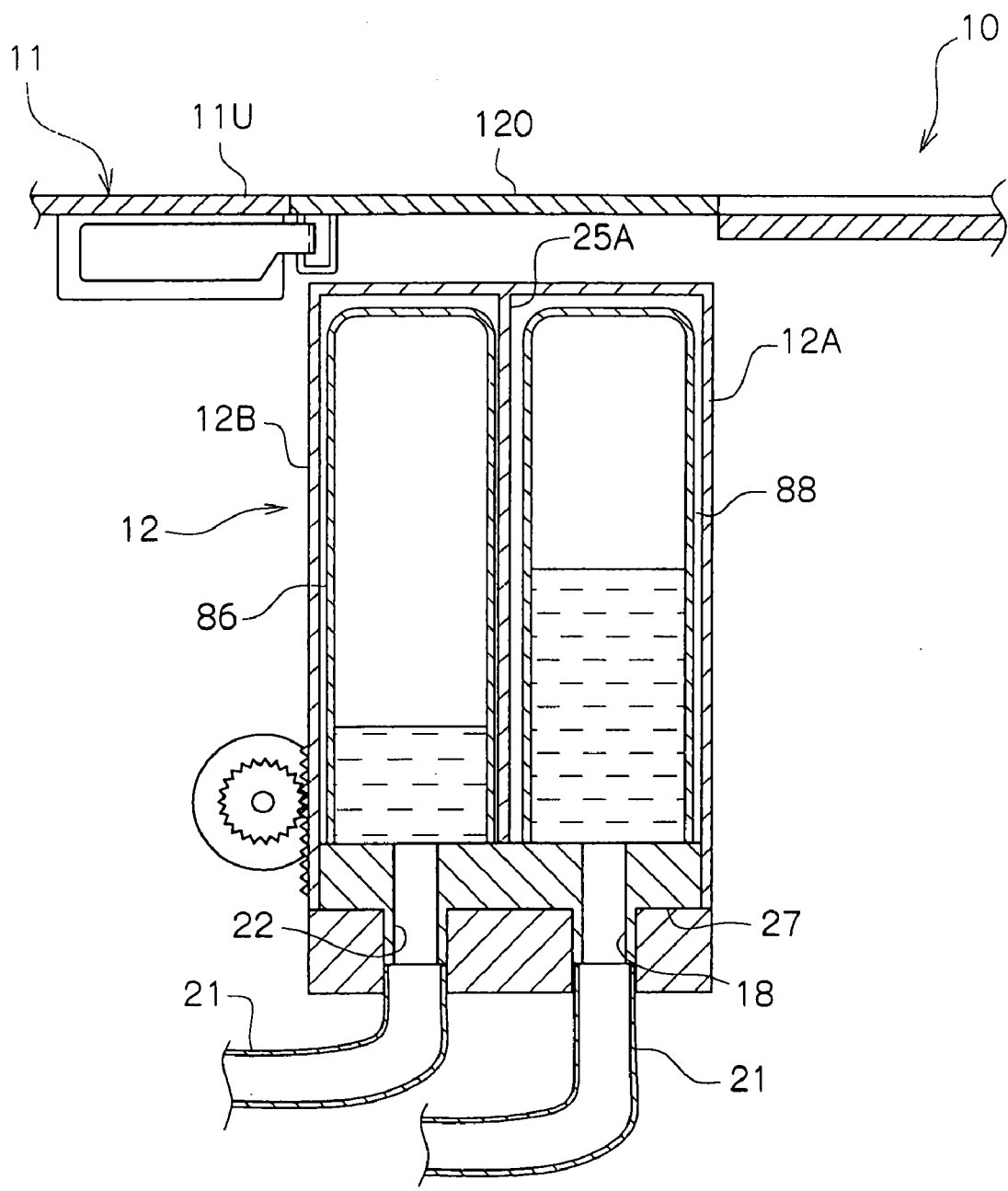
FIG. 4 is a sectional view showing a fuel tank and its vicinity of the digital still camera of the first embodiment of the invention.

The fuel tank 12 has a double layer structure of a fuel reservoir portion 12A for storing fuel and a water collection portion 12B for collecting water produced in the fuel cell 16. As shown in FIG. 4, one ends of tubes 21 are connected to a fuel supply port 18 and a water collection port 22 of the fuel tank 12, respectively, and the other ends of the tubes 21 are connected to a supply port 20 and a drain port 24 of the fuel cell 16, respectively. Thereby, the fuel tank 12 and the fuel cell 16 are connected in a water tight condition. Safety valves, which are not shown in the drawings, are provided in the fuel supply port 18 and the water collection port 22, and the safety valves are opened when the fuel supply port 18 and the supply port 20 as well as the water collection port 22 and the drain port 24 are connected.

Figure 2:
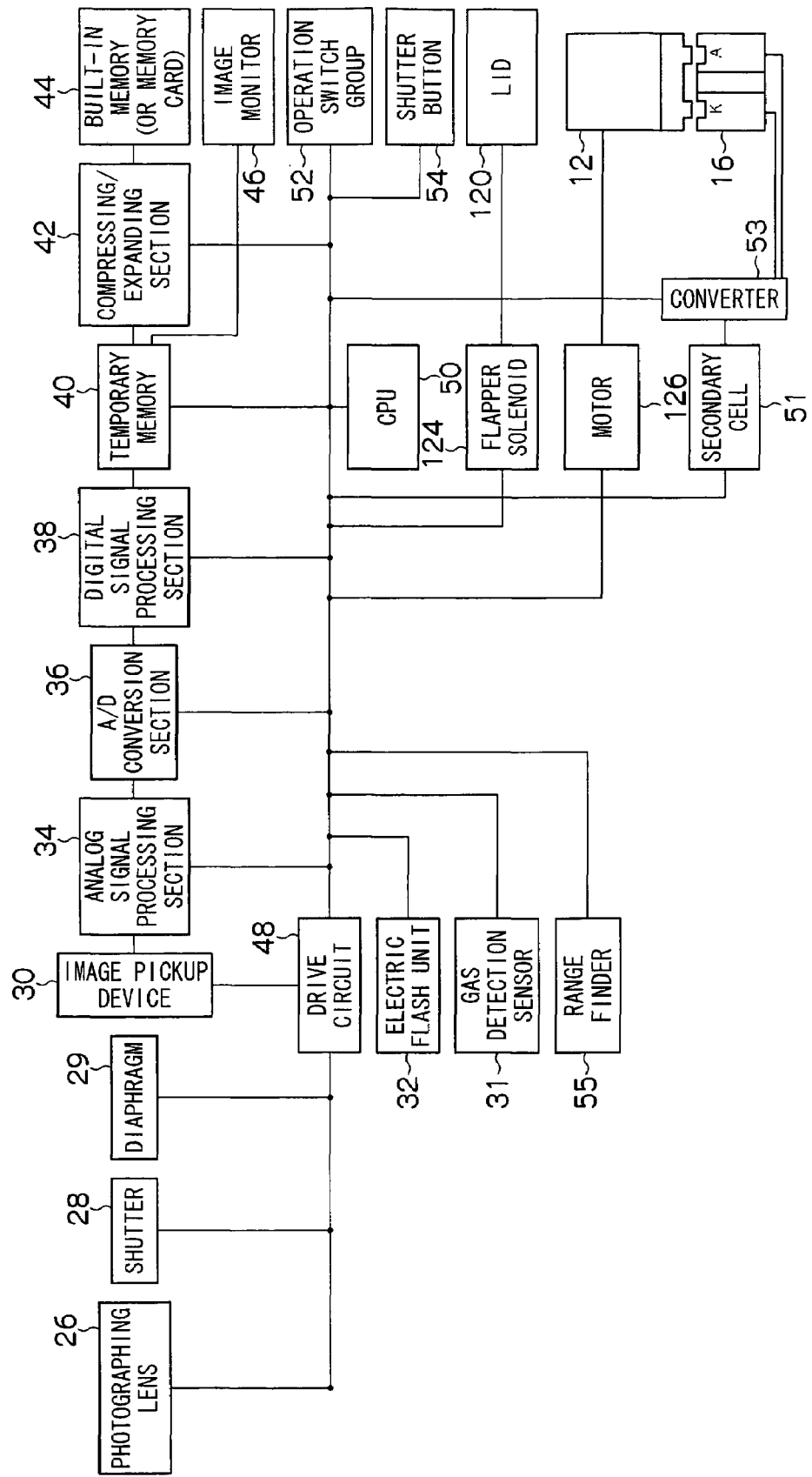
FIG. 2 is a block diagram showing a circuit configuration of the digital still camera of the first embodiment of the invention.

In FIG. 2, a block diagram showing a circuit configuration of the digital still camera 10 of the embodiment is shown.

In the digital still camera 10, a photographing lens 26, a shutter 28, a diaphragm 29, and a CCD image pickup device 30 are provided. The object image focused on the CCD image pickup device 30 via the photographing lens 26, the shutter 28, and the diaphragm 29 is converted into an analog image signal by the CCD image pickup device 30. Here, the occurrence of smear when the analog image signal is read out from the CCD image pickup device 30 is suppressed by the shutter 28.

Further, in the digital still camera 10, an electric flash unit 32 as auxiliary light emitting portion is built-in. The electric flash unit 32 emits flash light when the illuminance is low, or when needed other than the time when the illuminance is low, and applies auxiliary light to the object.

Moreover, in the digital still camera 10, an analog signal processing section 34, an A/D conversion section 36, a digital signal processing section 38, a temporary memory 40, a compressing/expanding section 42, a built-in memory (or memory card) 44, an image monitor 46, and a drive circuit 48 are provided.

The CCD image pickup device 30 is driven at timing generated by a timing generating circuit (not shown) within the drive circuit 48, and outputs an analog image signal. Further, the drive circuit 48 includes an AF control circuit for controlling the AF drive of the photographing lens 26, a zoom control circuit for controlling the zoom drive of the photographing lens 26, a shutter control circuit for controlling the drive of the shutter 28, a diaphragm control circuit for controlling the drive of the diaphragm 29, etc.

The analog image signal output from the CCD image pickup device 30 is subjected to analog signal processing in the analog signal processing section 34, A/D conversion in the A/D conversion section 36, and digital signal processing in the digital signal processing section 38. The digital image data that has been subjected to digital signal processing is temporarily stored in the temporary memory 40.

The digital image data that has been stored in the temporary memory 40 is compressed in the compressing/expanding section 42 and recorded in the built-in memory (or memory card) 44. Note that, according to the shooting mode, the data may be directly recorded in the built-in memory 44 with the compression process omitted. Then, the digital image data that has been stored in the temporary memory 40 is read out by the image monitor 46 and the object image is shown up on the image monitor 46.

In addition, in the digital still camera 10, a CPU 50 for controlling the entire digital still camera 10, an operation switch group 52 including a zoom operation switch etc., and a shutter button 54 are provided. The photo shooting is performed by setting a desired shooting condition by operating the operation switch group 52 and pressing down the shutter button 54.

Further, in the digital still camera 10, a secondary cell 51, a converter 53, and the fuel cell 16 are provided, and the respective sections constituting the digital still camera 10 are operated by the electrical energy generated by the fuel cell 16, or the electrical energy generated by the fuel cell 16 and buffered in the secondary cell 51.

Figure 3:
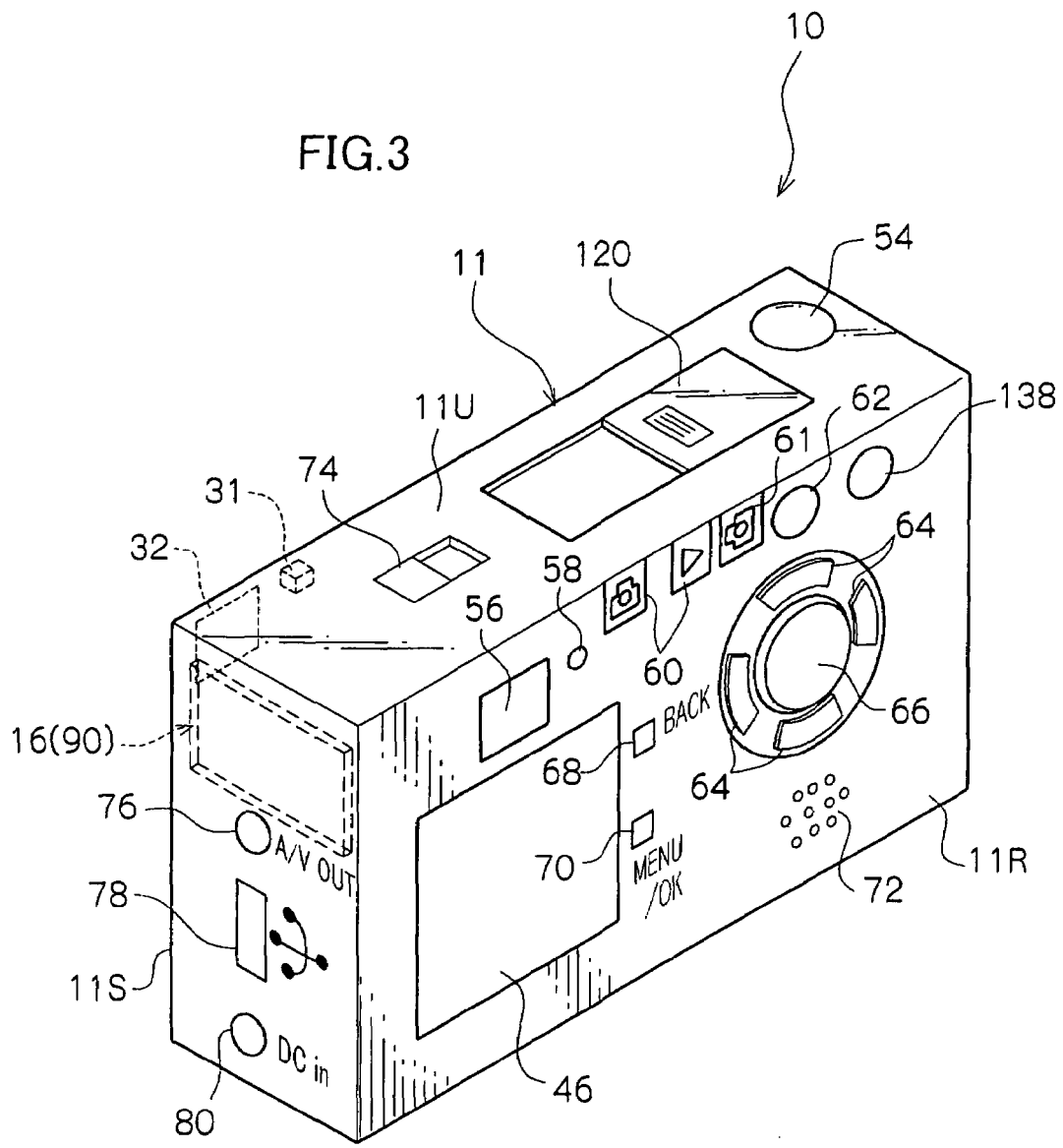
FIG. 3 is a perspective view showing the digital still camera of the first embodiment of the invention.

As shown in FIG. 3, on a rear panel 11R of the camera housing 11 of the digital still camera 10, a finder 56, a finder LED 58, a shooting/reproduction mode selector switch 60, a charging mode selector switch 61, a shooting mode selector switch 62, a multifunction cross key 64, a dot-matrix liquid crystal display unit 66 for displaying the operation mode of the camera, the function of the cross key, etc. with characters or icons, a back switch 68, a menu/OK switch 70, the image monitor 46, a speaker 72, etc. are provided. From the speaker 72, various kinds of warning sound and the like is sounded.

Further, on an upper panel 11U of the camera housing 11 of the digital still camera 10, a power switch 74 and the shutter button 54 are provided, and, on a side panel 11S of the digital still camera 10, an audio/visual (A/V) output terminal 76, a digital (USB) terminal 78, and a DC input terminal 80 are provided.

In the digital still camera 10, the shooting mode or reproduction mode can be selected by the shooting/reproduction mode selector switch 60, and, when the shooting mode is selected, the respective modes of manual shooting, auto shooting, moving picture, voice recorder, flash shooting, etc. can be selected by the shooting mode selector switch 62. Note that the voice recorder is a mode for recording sound only.

Further, in the digital still camera 10, the charging mode can be selected by the charging mode selector switch 61, and power generation is performed by the fuel cell 16 when the charging mode is selected, whereby the secondary cell 51 is charged.

The image monitor 46 can be used as an electronic view finder and can display a reproduced image and the like read out from the built-in memory (or memory card) 44. Further, on the image monitor 46, information such as an indication of the number of shootable frames and the reproduced frame number, with or without flash light, macro mode display, recording image quality indication, indication of the number of pixels are also displayed, and various kinds of menu are displayed in response to the operation of the menu/OK switch 70 and the cross key 64. Furthermore, various warning indications are displayed.

As shown in FIG. 4, a casing 25 of the fuel tank 12 is partitioned by a partition plate 25A to have a double layer structure of the fuel reservoir portion 12A and the water collection portion 12B. The fuel reservoir portion 12A and the water collection portion 12B are sealed by a cap 27. In the cap 27, the fuel supply port 18 is provided so as to face the fuel reservoir portion 12A, and the water collection port 22 is provided so as to face the water collection portion 12B. To the fuel supply port 18 and the water collection port 22, one ends of the tubes 21 are connected. Further, a valve (not shown) is provided in the fuel supply port 18 or the tube 21 communicating therewith to supply a necessary amount of fuel.

In the water collection portion 12B, a bag 86 for collecting water is accommodated, and the mouth thereof is attached to the water collection port 22. In the fuel reservoir portion 12A, a bag 88 for storing fuel is accommodated, and the mouth thereof is attached to the fuel supply port 18. The bag 88 is an alcohol resistance material such as Teflon (registered trademark) rubber.

As shown in FIGS. 1 and 3, inside the camera housing 11, plural fuel cells 16 are disposed in the vicinity of a front panel 11F, the upper panel 11U, and the side panel 11S and in parallel with the respective panels. Note that, in the embodiment, the fuel cells 16 (proton conducting films 90) and the corresponding respective panels (outer walls) are completely parallel because all of the respective panels are formed in planar shapes. However, even if the proton conducting films 90 are slightly slanted relative to the corresponding panels, as long as the membranes are disposed substantially parallel to the panels, the structure is included within the concept of "substantially parallel" of the invention. Further, according to the kind of the camera housing 11, sometimes a part of the panel (outer wall) is bent or curved, however, in this case, the structure in which the fuel cells 16 (proton conducting films 90) are bent or curved along the panel is also included within the concept of "substantially parallel" of the invention.

Each of the fuel cells 16 is constituted by a proton conducting film 90 in a film form, catalyst layers 92A and 92B disposed on both ends of the proton conducting film 90 sequentially in a thickness direction thereof, carbon papers 94A and 94B, and adsorption sheets 96A and 96B, and these are as a whole disposed integrally with the respectively corresponding panels of the camera housing 11. As the integrally disposed constitution, for example, a constitution in which an engaging member such as a claw is provided on the corresponding panel for engaging with a package (not shown) of the fuel cell 16 is adopted, they can be easily integrated. In the constitution, an engaged member, with which the engaging member engages, may be provided to the fuel cell 16. Further, the corresponding panel and a part of the fuel cell 16 (the above described package and the like) may be completely integrated by welding.

Furthermore, on the corresponding panel, a buffer member 19 constituted by rubber, an expandable resin, a spring, or the like is provided between the fuel cell 16 and the panel. Due to the buffer member 19, even when an impact acts on the digital still camera 10 due to dropping or the like, the impact transmission to the fuel cell 16 is reduced, and the fuel cell 16 can be protected from the impact.

Electrodes (not shown) to be applied with a voltage are connected to the carbon papers 94A and 94B. The fuel cell 16 is a methanol direct fuel cell for generating power by the chemical reaction between the methanol solution and oxygen ($O_2$) and producing water ($H_2O$) and carbon dioxide ($CO_2$) as by product materials. Note that the produced water is collected in the water collection portion 12B via the drain port 24 and the water collection port 22.

When the fuel is supplied from the fuel tank 12 to the adsorption sheet 96B via the tube 12 and a voltage is applied to the carbon papers 94A and 94B, methanol is decomposed into carbon dioxide, protons, and electrons as expressed by the chemical equation (1).

$$CH_3OH+H_2O \rightarrow CO_2+6H^++e^- \qquad (1)$$

The carbon dioxide is released via a gas-liquid separation filter (not shown) disposed adjacently to the adsorption sheet 96B, and the protons move to the catalyst layer 92A while being transmitted through the proton conducting film 90. Then, the electrons travel toward the respective sections of the camera when the respective sections of the camera are activated, and, when the respective sections of the camera are not activated, the electrons travel toward the secondary cell 51 (see FIG. 2) to charge the secondary cell 51.

The proton $H^+$ that has moved to the catalyst layer 92A bonds with the oxygen that has been transmitted through the gas-liquid separation filter (not shown) and flown in and electrons to produce water. Note that the adsorption sheet 96A also serves as an air chamber of the invention, and the oxygen in the air within the adsorption sheet 96A is used for the reaction. Further, the produced water is adsorbed by the adsorption sheet 96A. The adsorption sheet 96A is disposed so as to face toward the outside of the camera housing 11 in order to discharge the water efficiently to the outside of the camera housing 11.

Note that it is preferred that at least a part of outer surfaces of the camera housing 11, where the fuel cell 16 is disposed, is constituted by a mesh member in which a large number of minute air holes are formed such as a metal mesh, sheet material, or Gore-Tex (trade name) in order to make the inflow of oxygen from outside easier and to discharge only a vapor while preventing the accidental inflow of water. In order to make the inflow of oxygen from outside easier and to discharge only a vapor while preventing the accidental inflow of water, just simple holes may be formed. However, it is more preferable that foreign materials (dust and the like) entering from outside can be prevented by using such mesh member.

Further, the plural fuel cells 16 are connected to each other by connecting portions 98 so that fluids (fuel, oxygen, water, carbon dioxide) and electrons may be allowed to flow. The connecting portions 98 may be arranged at least so as to allow the fuel to flow, and the fluids other than the fuel may be allowed to flow if necessary.

The digital still camera 10 of the first embodiment is driven by receiving the power supply from the fuel cells 16 as described above. The fuel cells 16 are disposed in the vicinity of the front panel 11F, the upper panel 11U, and the side panel 11S of the camera housing 11 and in parallel with the respective panels. That is, the proton conducting film 90, the catalyst layers 92A and 92B, the carbon papers 94A and 94B, and the adsorption sheets 96A and 96B constituting the fuel cell 16 are as a whole disposed integrally as a part of the corresponding panel of the camera housing 11 along the panel. Accordingly, a broader cell area, i.e., the area of the proton conducting film 90 can be ensured compared to the conventional one. Therefore, the necessary power for driving the digital still camera 10 can be supplied reliably. Furthermore, since the fuel cells 16 are disposed along the respective panels of the camera housing 11, the upsizing of the digital still camera 10 is not caused.

Note that, in the example shown in FIG. 1, the fuel cell 16 disposed along the side panel 11S at the rear side in the drawing and the fuel cell 16 disposed along the front panel 11F are continued. That is, two fuel cells 16 are disposed in a bent shape within the camera housing 11, and thereby, the air space produced within the camera housing 11 can be utilized more effectively and the broader cell area (the area of the proton conducting film 90) can be ensured compared to the constitution in which these fuel cells are divided.

Further, in the case where the plural fuel cells 16 are disposed within the digital still camera 10 as described above, the connection between the fuel cells 16 is not limited specifically, as long as the necessary power for driving the digital still camera 10 is obtained. However, even in the case where the sufficient voltage cannot be obtained by each one of the fuel cells 16, the sufficient voltage can be obtained by the serial connection of the fuel cells 16.

Figure 6:
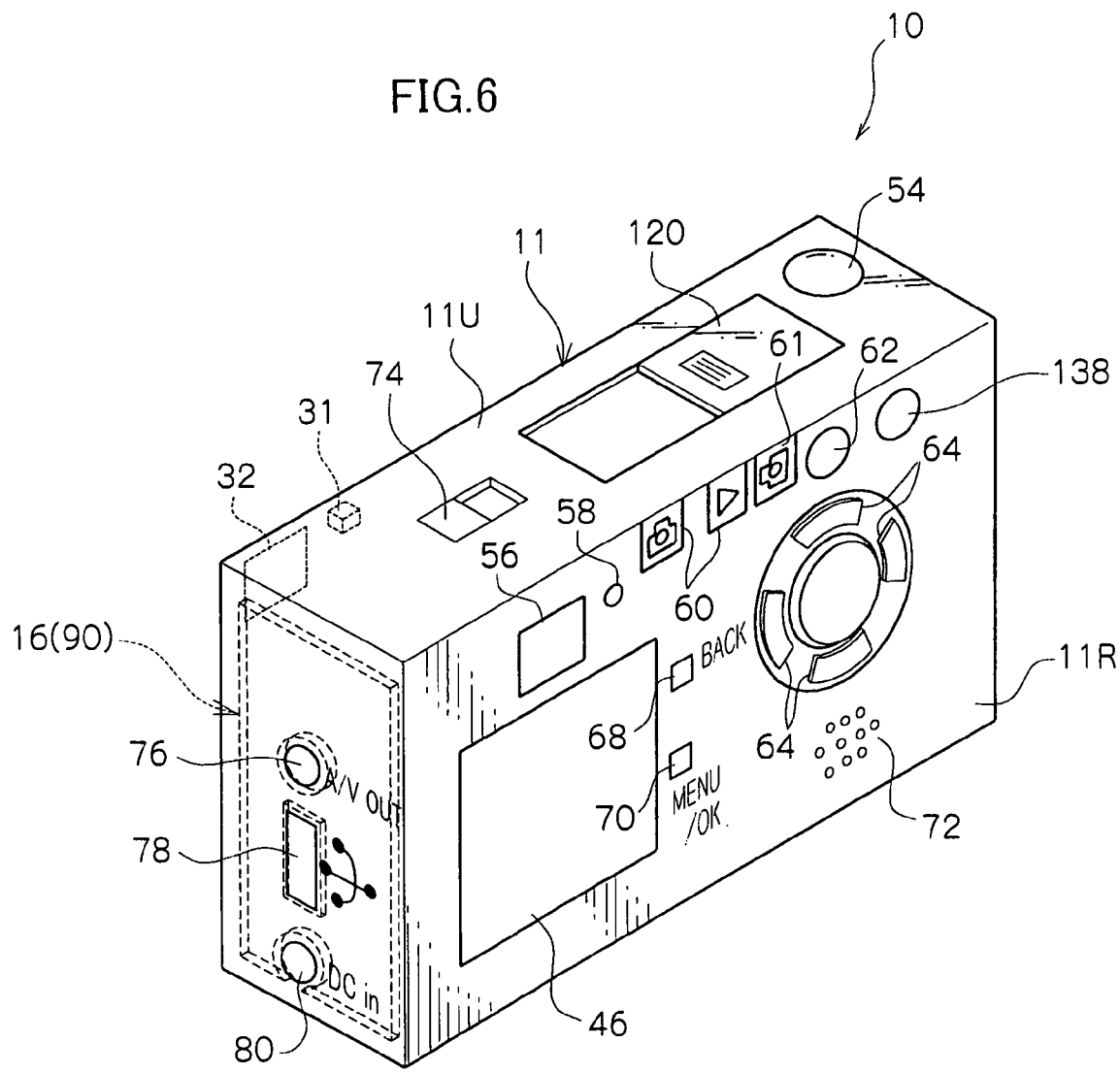
FIG. 6 is a perspective view showing a first modified example of the digital still camera of the first embodiment of the invention.

In addition, as a first modified example shown in FIG. 6, the fuel cell 16 (proton conducting film 90) may be disposed so as to correspond to only the side panel 11S of the camera housing 11. Especially, in the case where the necessary power and voltage can be obtained with one fuel cell 16, the constitution shown in FIG. 6 may be adopted to simplify the structure. In the constitution, the fuel cell 16 (proton conducting film 90) may be disposed so as to avoid the audio/visual (A/V) output terminal 76, the digital (USB) terminal 78, the DC input terminal 80, etc. on the side panel 11S.

Figure 7:
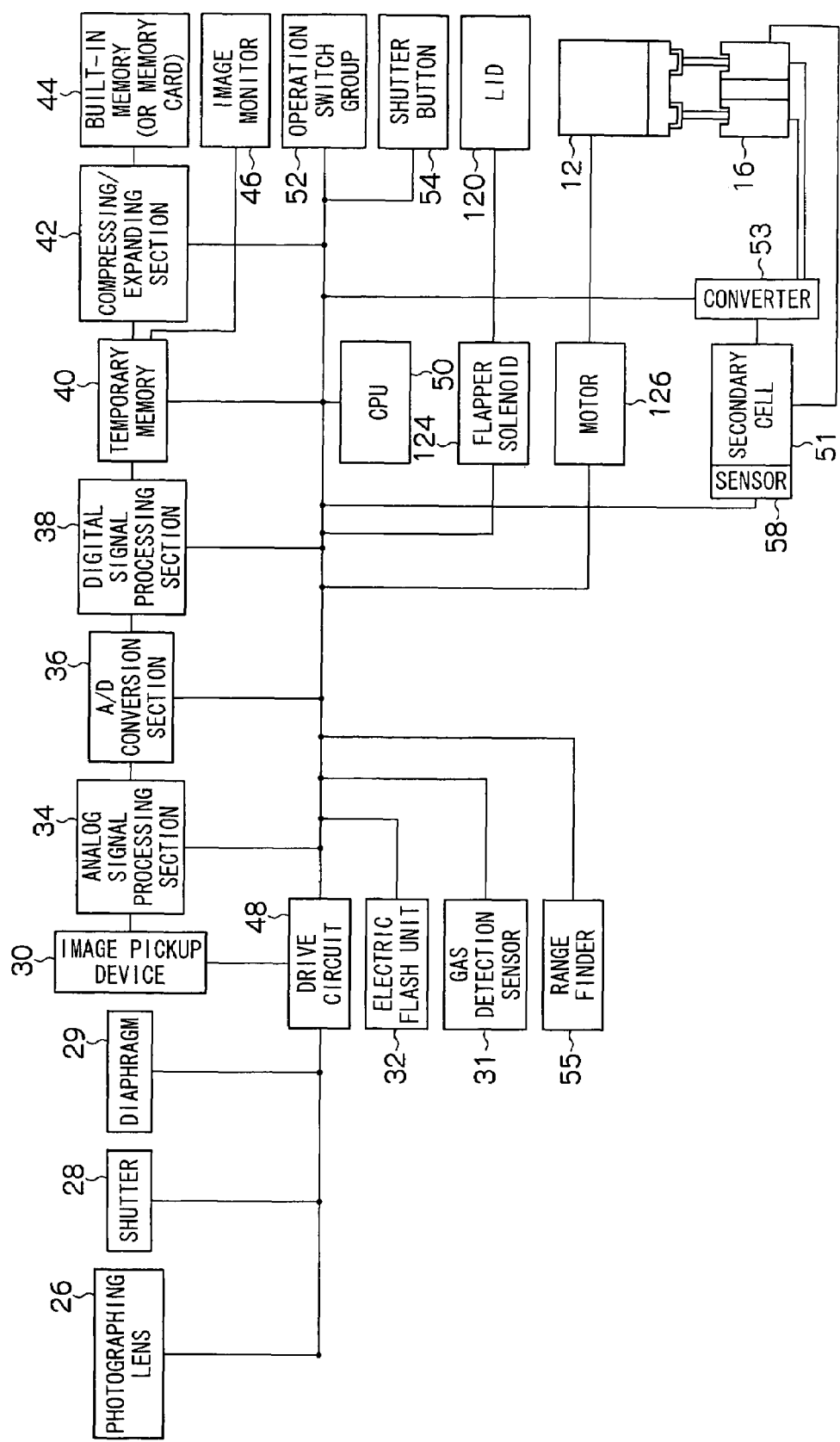
FIG. 7 is a block diagram showing the circuit configuration of a second modified example of the digital still camera of the first embodiment of the invention.

In FIG. 7, the circuit configuration of a second modified example of the first embodiment is shown. Note that, in the respective modified examples of the first embodiment described below, the description of the overall constitution of the digital still camera will be omitted because it is similar to that in the first embodiment, and only the different points will be described.

In the second modified example, a storage sensor 58 for detecting the storage amount of the secondary cell 51 is provided. Voltage control portion (not shown) is controlled according to the storage amount data detected by the storage sensor 58, and the applied voltage to the carbon papers 94A and 94B of the fuel cell 16 is controlled. Thereby, when the storage amount in the secondary cell 51 is large, the electrochemical reaction in the fuel cell 16 is suppressed to reduce the generated amount of power, and thus, the wasteful fuel consumption can be suppressed and overcharging of the secondary cell 51 can be prevented.

Figure 8:
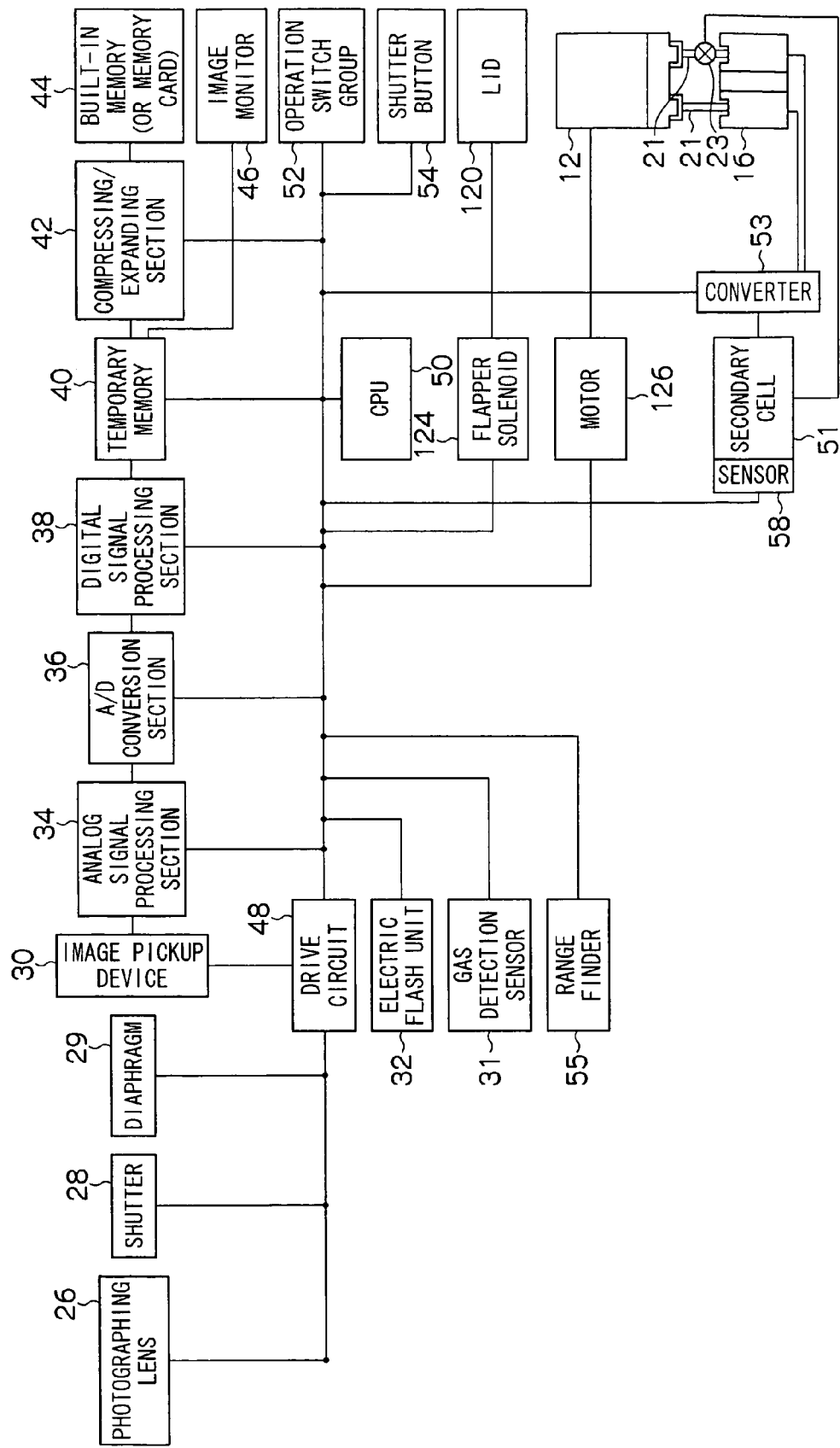
FIG. 8 is a block diagram showing the circuit configuration of a third modified example of the digital still camera of the first embodiment of the invention.
Figure 9:
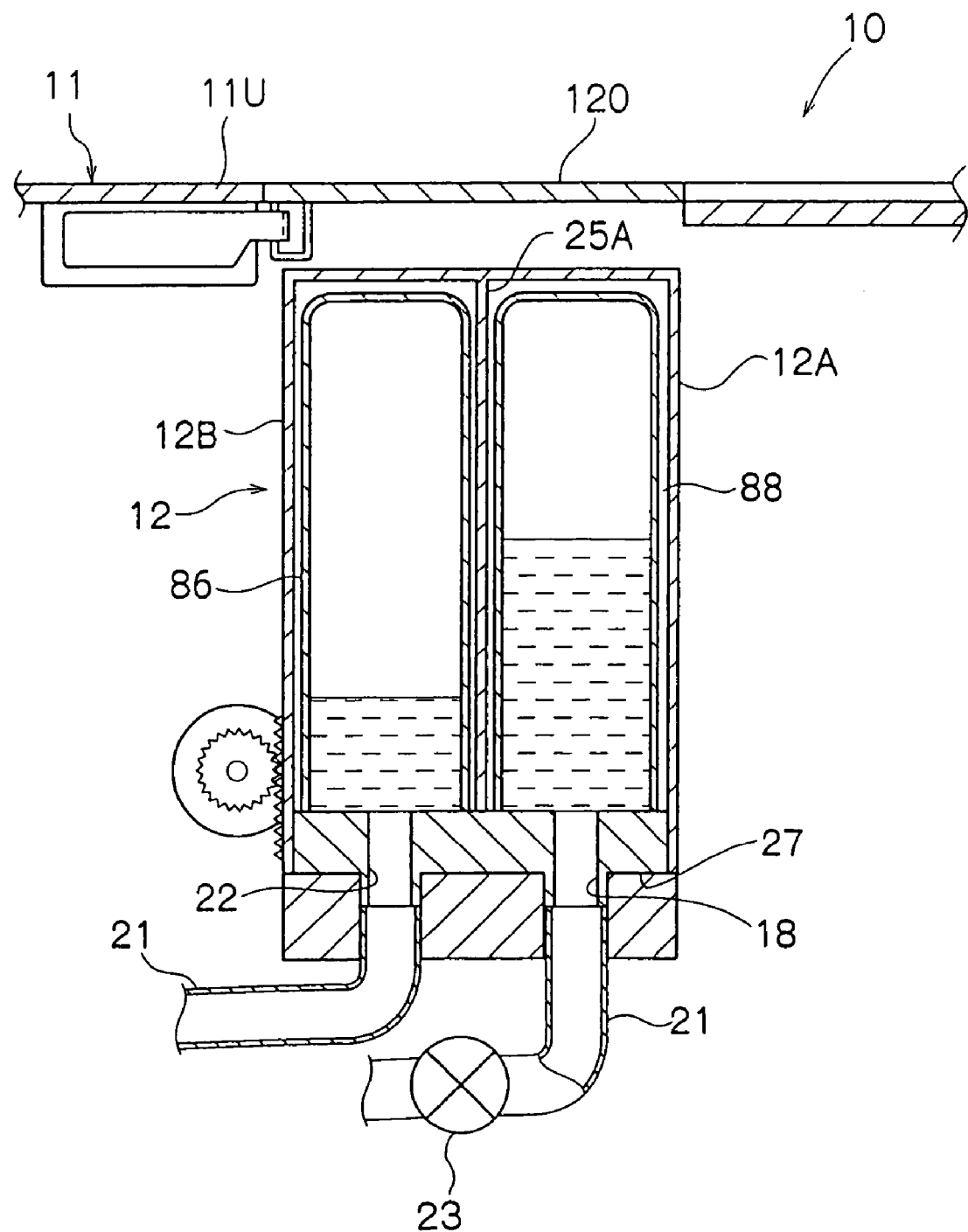
FIG. 9 is a sectional view showing a fuel tank and its vicinity of the digital still camera of the third modified example of the first embodiment of the invention.

In a third modified example shown in FIG. 8, the storage amount of the secondary cell 51 is detected by the storage sensor 58 in a same manner as in the second modified embodiment. Further, as shown in FIG. 9, a flow rate regulating valve 23 is provided in the tube 21 for supplying the fuel, and the amount of fuel supply to the fuel cell 16 is adjusted by the flow rate regulating valve 23.

Figure 10:
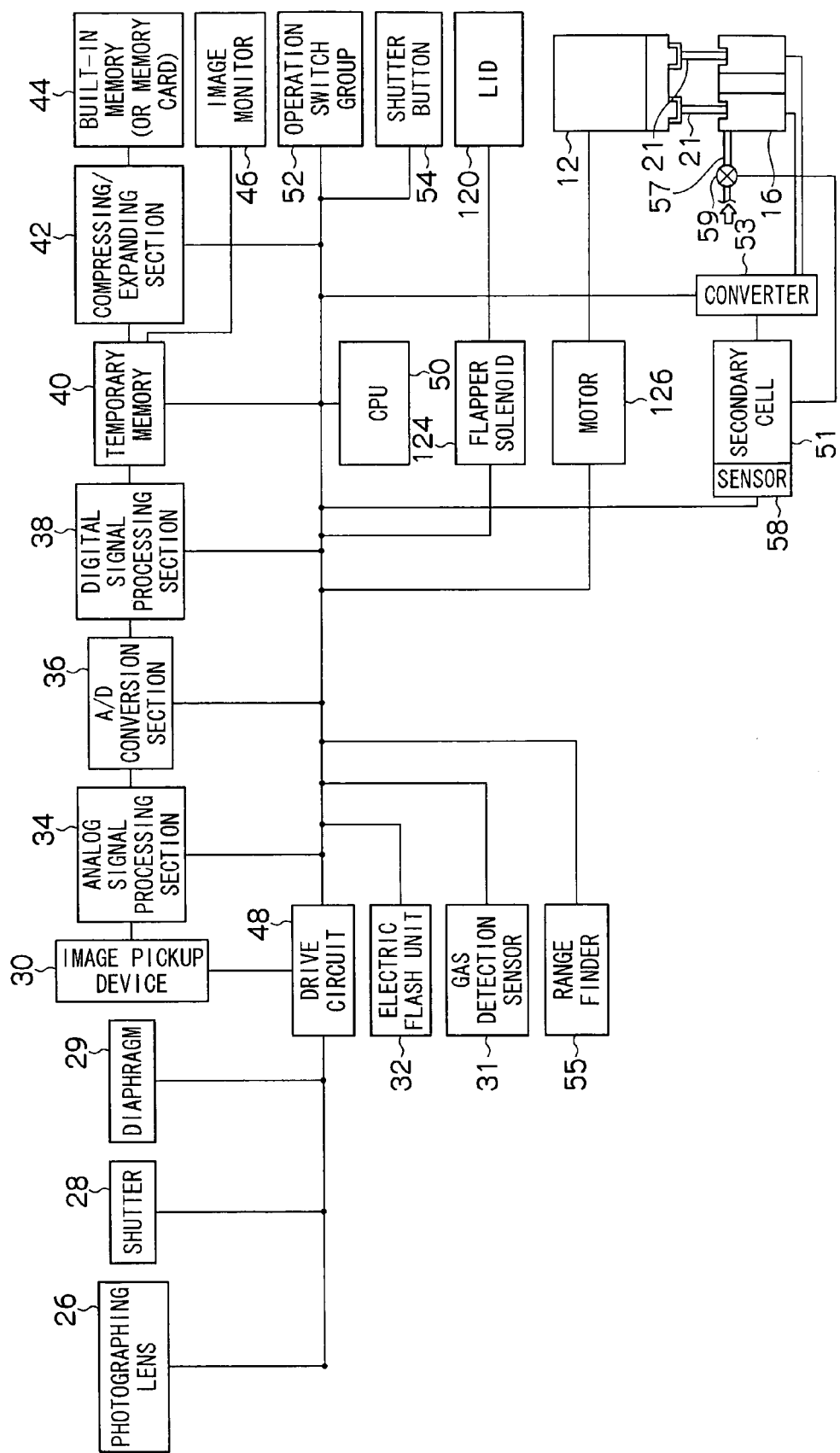
FIG. 10 is a block diagram showing the circuit configuration of a fourth modified example of the digital still camera of the first embodiment of the invention.
Figure 11A:
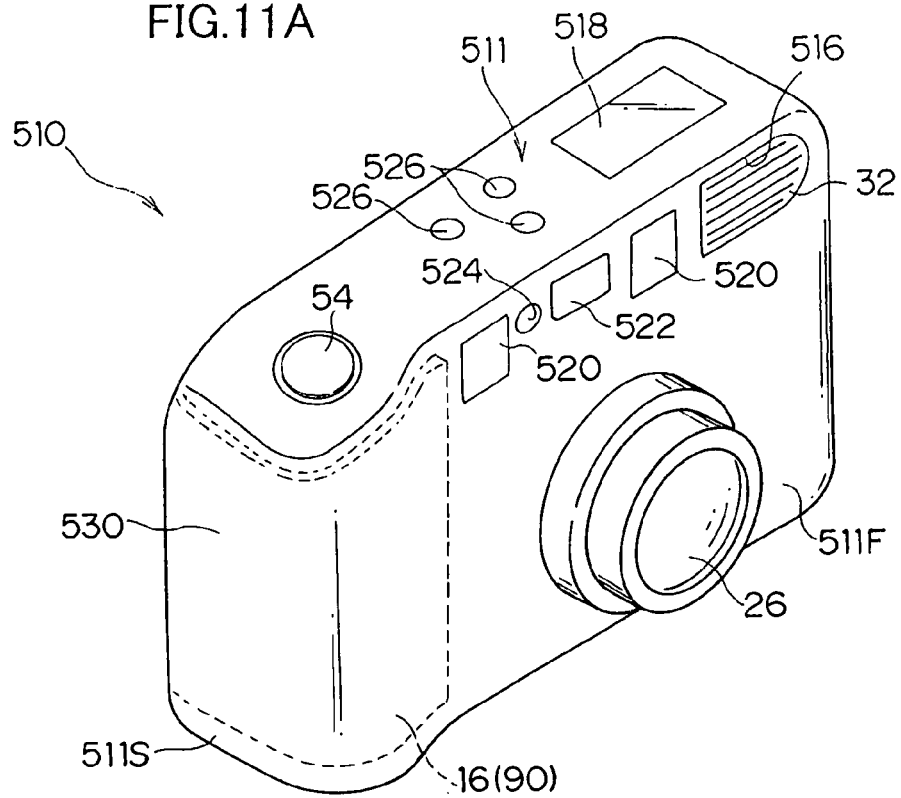
FIG. 11A is a perspective view showing a silver-halide film camera of a second embodiment of the invention.
Figure 11B:
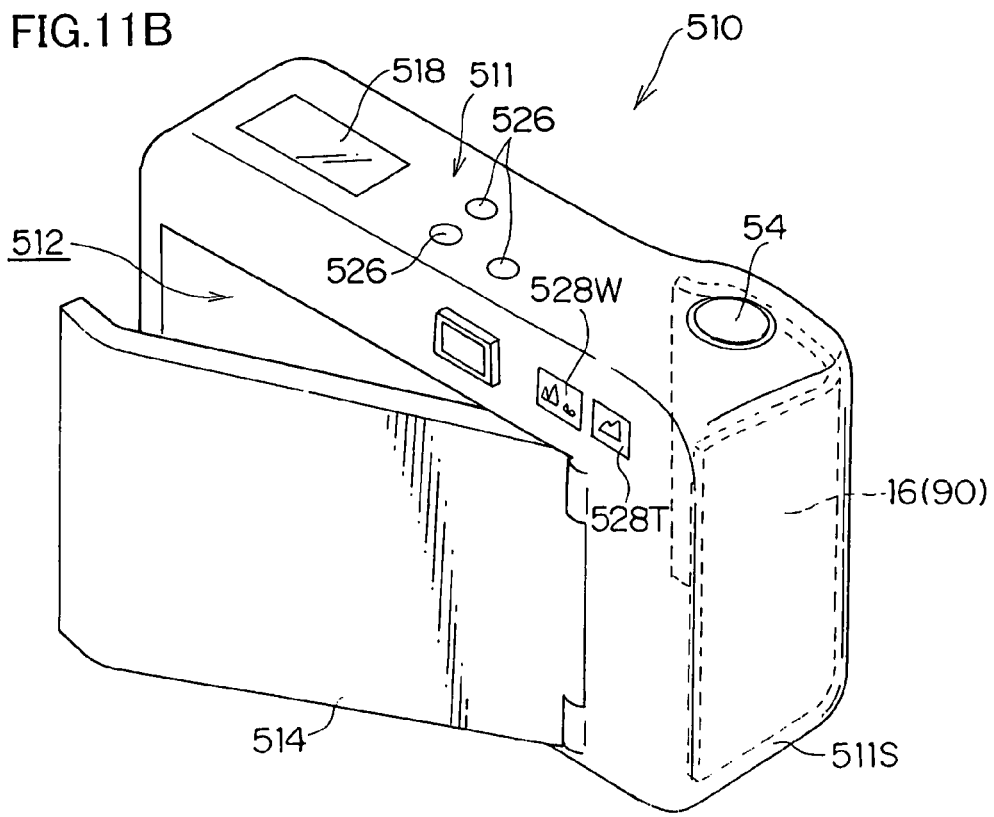
FIG. 11B is a perspective view showing the silver-halide film camera of the second embodiment of the invention.

In a fourth modified example shown in FIG. 10, a flow rate regulating valve 59 is provided in an air supply tube 57 for supplying the air to the fuel cell 16, and the amount of air (oxygen) supply to the fuel cell 16 is adjusted by the flow rate regulating valve 59.

Therefore, in both the third modified example and the fourth modified example, as well as in the second modified example, when the storage amount in the secondary cell 51 is large, the electrochemical reaction in the fuel cell 16 is controlled in order to reduce the generated amount of power, and thus, the wasteful fuel consumption can be suppressed and overcharging of the secondary cell 51 can be prevented.

Further, in any one of the above described constitutions, by effectively utilizing the air space (so-called dead space) produced inside the camera housing 11 to dispose the fuel cell 16 (proton conducting film 90) in the dead space, the necessary power can be ensured without upsizing the digital still camera 10.

Next, a second embodiment will be described. Note that, in the respective embodiments described below, components that are the same as in the first embodiment are assigned with the same reference numerals, and the description thereof will be omitted.

As shown in FIGS. 1A and 1B, in the second embodiment, a so-called silver-halide film camera 510 is cited as a portable device of the invention. The silver-halide film camera 510 includes a photographing lens 26, a shutter 28, a diaphragm 29, and a film accommodation portion 512, and the film accommodation portion 512 can be opened or closed by a back cover 514 rotatably mounted to a camera housing 511. An object image is formed in a particular frame position of the film within the film accommodation portion 512 via the photographing lens 26, the shutter 28, and the diaphragm 29.

In the silver-halide film camera 510, as well as in the digital still camera 10 of the first embodiment, an electric flash unit 32 as auxiliary light emitting portion is built-in. The electric flash unit 32 emits flash light when the illuminance is low, or when needed other than the time when the illuminance is low, and applies auxiliary light to the object.

Further, on the camera housing 511, a display panel 518, an AF window 520, a finder window 522, a photometer window 524, various buttons 526, zoom buttons 528W and 528T are disposed.

In the vicinity of the end in the width direction of the camera housing 511, a front panel 511F is bulged frontward and the bulged portion and the side panel 511S form a grip portion 530. A user can hold the silver-halide film camera 510 easily by holding the grip portion 530.

Further, in the silver-halide film camera 510, a fuel cell 16 (proton conducting film 90) is disposed along the grip portion 530, and the proton conducting film 90, catalyst layers 92A and 92B, carbon papers 94A and 94B, and adsorption sheets 96A and 96B constituting the fuel cell 16 are as a whole disposed integrally along the grip portion 530. Furthermore, the adsorption sheet 96A is disposed so as to face toward the outside of the grip portion 530 in order to discharge the water produced by the electrochemical reaction efficiently to the outside.

Therefore, in a case where the silver-halide film camera 510 is used, when the user grasps the grip portion 530, his/her body heat is transmitted to the fuel cell 16 and the fuel cell 16 is activated.

Moreover, as similarly as in the first embodiment, since a broader cell area, i.e. the area of the proton conducting film 90, can be ensured compared to the conventional one, the necessary power can be supplied reliably. By effectively utilizing the air space (so-called dead space) produced inside the camera housing 511 to dispose the fuel cell 16 (proton conducting film 90) in the dead space, the necessary power can be ensured without upsizing the silver-halide film camera 510. Thereby, the cell space, which is conventionally required, becomes dispensed with. Especially, since the fuel cell 16 is disposed by being curved (bent) along the grip portion 530 within the camera housing 511, the area of the proton conducting film 90 can be made broader compared to that in the constitution in which the fuel cell 16 is disposed in a planer shape.

In the second embodiment, the silver-halide film camera is cited as an example. However, the constitution in which the fuel cell 16 (proton conducting film 90) is disposed in the vicinity of the grip 530 can also be applied to a digital still camera.

Figure 12:
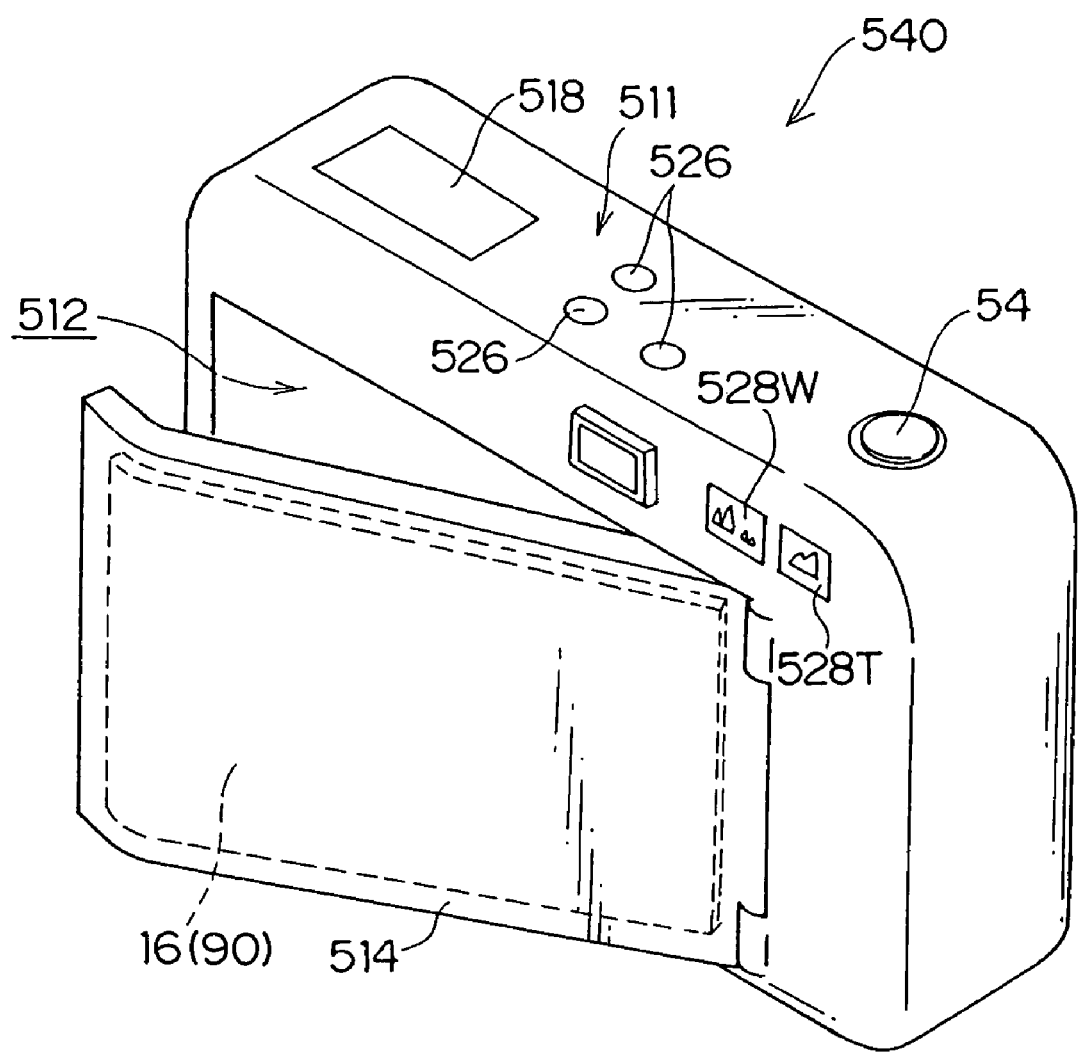
FIG. 12 is a perspective view showing a silver-halide film camera of third embodiment of the invention.

In FIG. 12, a silver-halide film camera 540 of the third embodiment of the invention is shown. This silver-halide film camera 540 has substantially the same constitution as the silver-halide film camera 510 of the second embodiment. However, it has a difference in that the fuel cell 16 (proton conducting film 90) is disposed along a back cover 514.

Thus, when the constitution in which the fuel cell 16 (proton conducting film 90) is disposed along the back cover 514 is adopted, since a broader cell area, i.e. the area of the proton conducting film 90, can be ensured compared to the conventional one, the necessary power can be supplied more reliably. Further, by effectively utilizing the dead space produced along the back cover 514 to dispose the fuel cell 16 (proton conducting film 90) in the dead space, the necessary power can be ensured without upsizing the silver-halide film camera 540. Especially, in the silver-halide film camera using a film of so-called 135 type, the back cover 514 is generally provided, and, in the silver-halide film cameras using a film of 120 type or 220 type (or a rolled film), such back cover 514 is often provided. The embodiment is preferable because the back cover 514 is effectively utilized to dispose the fuel cell 16 efficiently.

Note that, in the third embodiment, as well as in the second embodiment, the adsorption sheet 96A of the fuel cell 16 is disposed so as to face toward the outside of the grip portion 530 in order to discharge the water produced by the electrochemical reaction efficiently to the outside. In the camera housing 511, the portion corresponding to the fuel cell 16 is preferably formed by a mesh member.

Figure 13A:
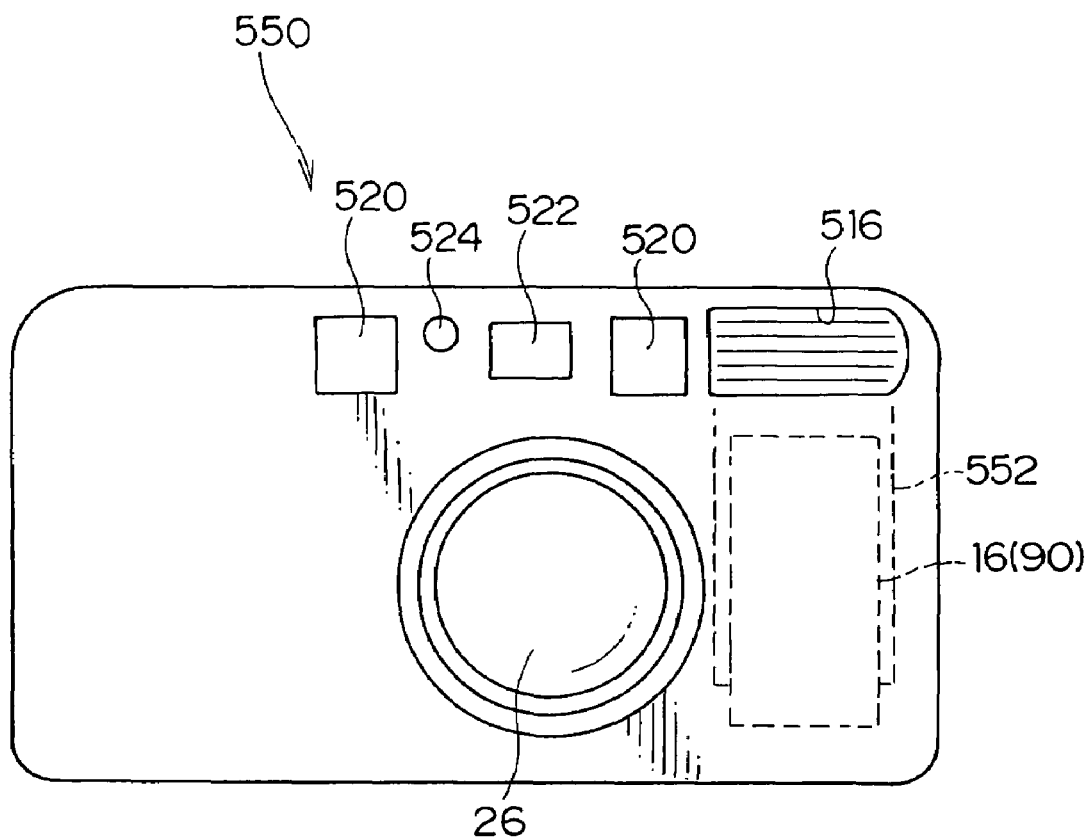
FIG. 13A is a front view showing a silver-halide film camera of fourth embodiment of the invention.
Figure 13B:
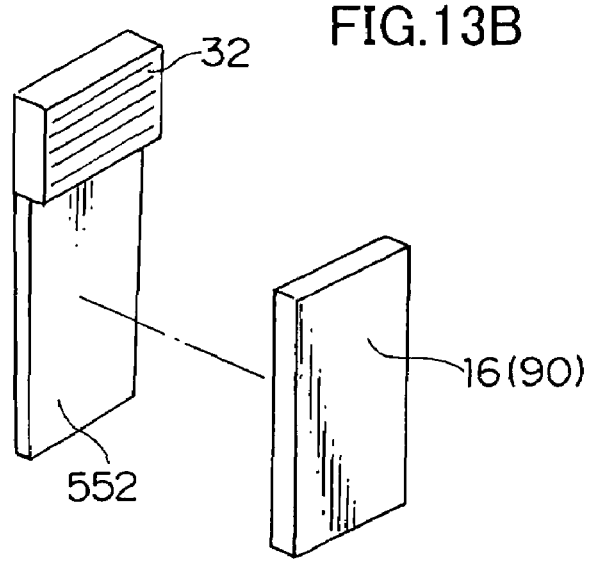
FIG. 13B is a perspective view showing an electric flash unit and the fuel cell of the silver-halide film camera of the fourth embodiment of the invention.

In FIGS. 13A and 13B, a silver-halide film camera 550 of the fourth embodiment of the invention is shown. In this silver-halide film camera 550, the fuel cell 16 (proton conducting film 90) is disposed in contact with a substrate 552 for performing control and charge and power supply on the electric flash unit 32 between the substrate 552 and the front panel 511F.

Therefore, in the silver-halide film camera 550, the heat generated in the substrate 552 is transmitted to the fuel cell 16 and the fuel cell 16 is activated. Simultaneously, the substrate 552 may dissipate heat through the fuel cell 16.

Further, as similarly as in the first embodiment, since a broader cell area, i.e. the area of the proton conducting film 90, can be ensured compared to the conventional one, the necessary power can be supplied reliably. By effectively utilizing the air space (so-called dead space) produced inside the camera housing 511 to dispose the fuel cell 16 (proton conducting film 90) in the dead space, the necessary power can be ensured without upsizing the silver-halide film camera 550.

Note that, in the fourth embodiment, as well as in the second embodiment and the third embodiment, the adsorption sheet 96A is disposed so as to face toward the outside of the camera housing 511 in order to discharge the water produced by the electrochemical reaction efficiently to the outside. In the camera housing, the portion corresponding to the fuel cell 16 is preferably formed by a mesh member.

Figure 14:
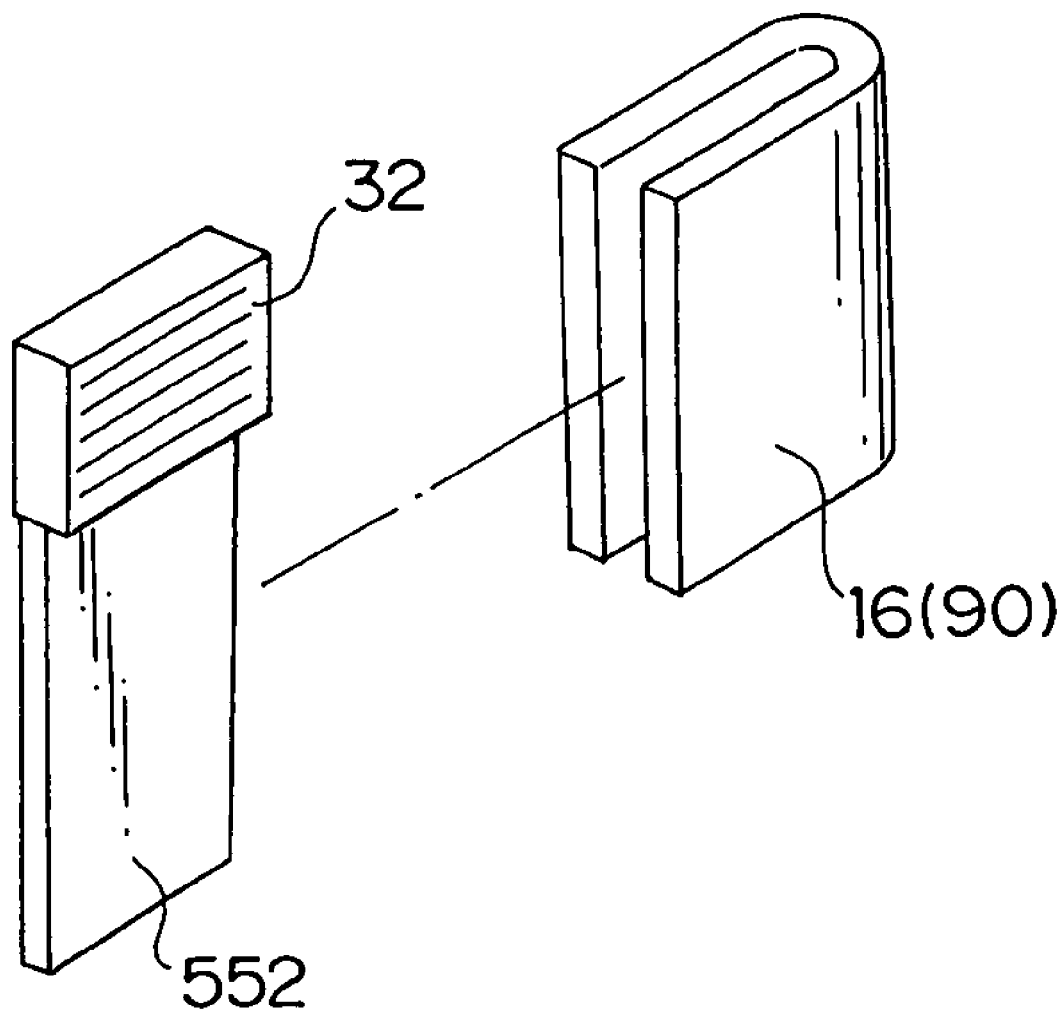
FIG. 14 is a perspective view showing the electric flash unit and the fuel cell applied to a modified example of the silver-halide film camera of the fourth embodiment of the invention.

In FIG. 14, a modified example of the fourth embodiment is shown. In this modified example, the constitution of the silver-halide film camera is the same as shown in FIGS. 13A and 13B. However, the fuel cell 16 (proton conducting film 90) has a form with end surfaces substantially in a U-shape by being curved substantially at the center thereof, and the end surfaces are made in contact with both the front surface and the rear surface of the substrate 552. Thus arranged, as the fuel cell 16 (proton conducting film 90), the broader area can be ensured.

In the fourth embodiment and the modified example thereof, the silver-halide film camera is cited as an example. However, the constitution in which the fuel cell 16 (proton conducting film 90) is disposed along the substrate 552 can also be applied to a digital still camera.

Further, the invention is not limited to the substrate 552 for performing control, charging and power supply with respect to the electric flash unit 32, and any substrate may be used. Note that a substrate whose temperature rises is preferable because the fuel cell 16 is activated by the heat thereof as described above.

Next, the fifth embodiment will be described. Note that components that are the same as in the first embodiment are assigned with the same reference numerals, and the descriptions thereof will be omitted. In the fifth embodiment, a cellular phone with digital camera 100 is cited as a portable device of the invention.

Figure 15:
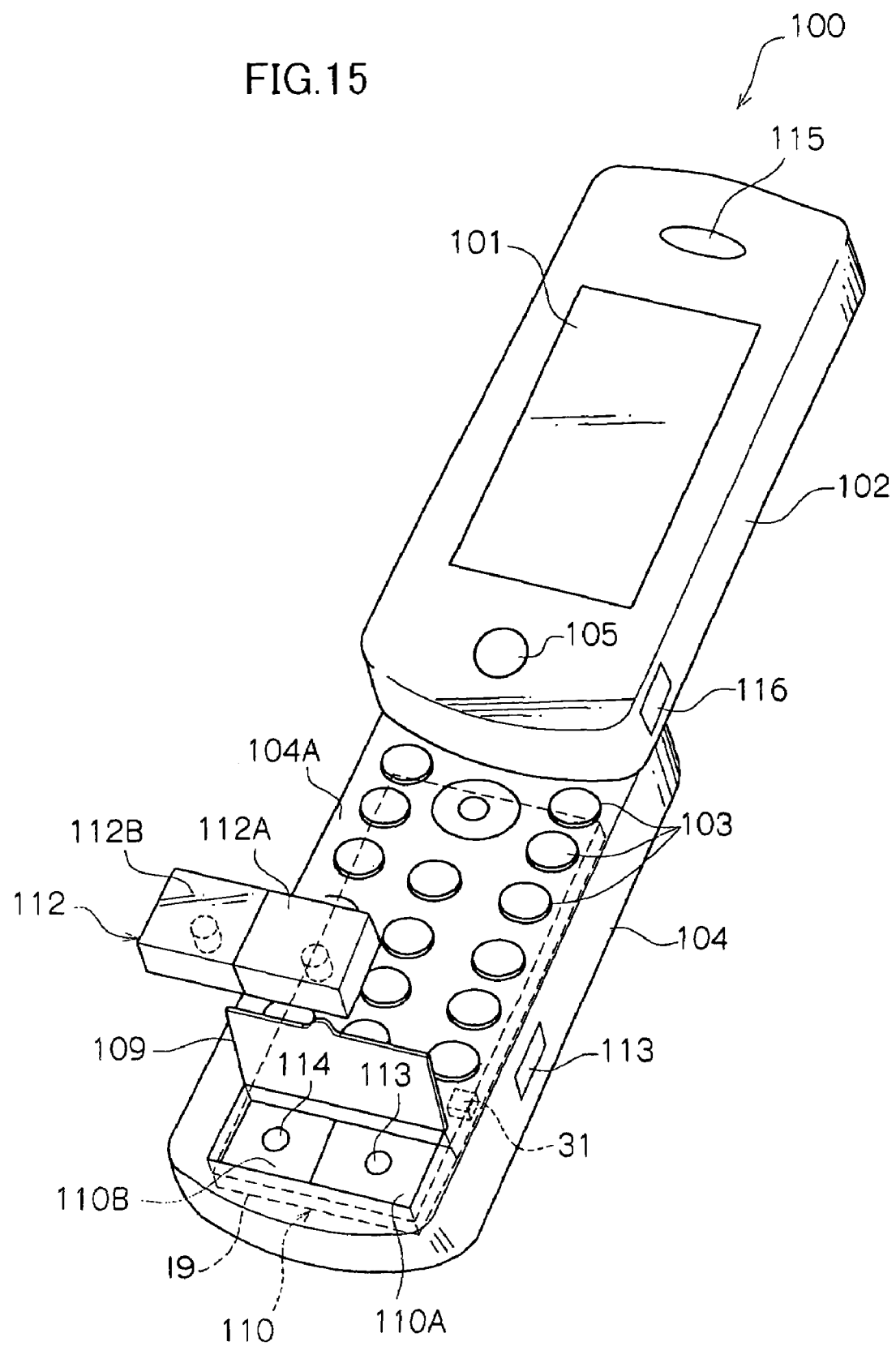
FIG. 15 is a perspective view showing a cellular phone with digital camera of a fifth embodiment of the invention.
Figure 16:
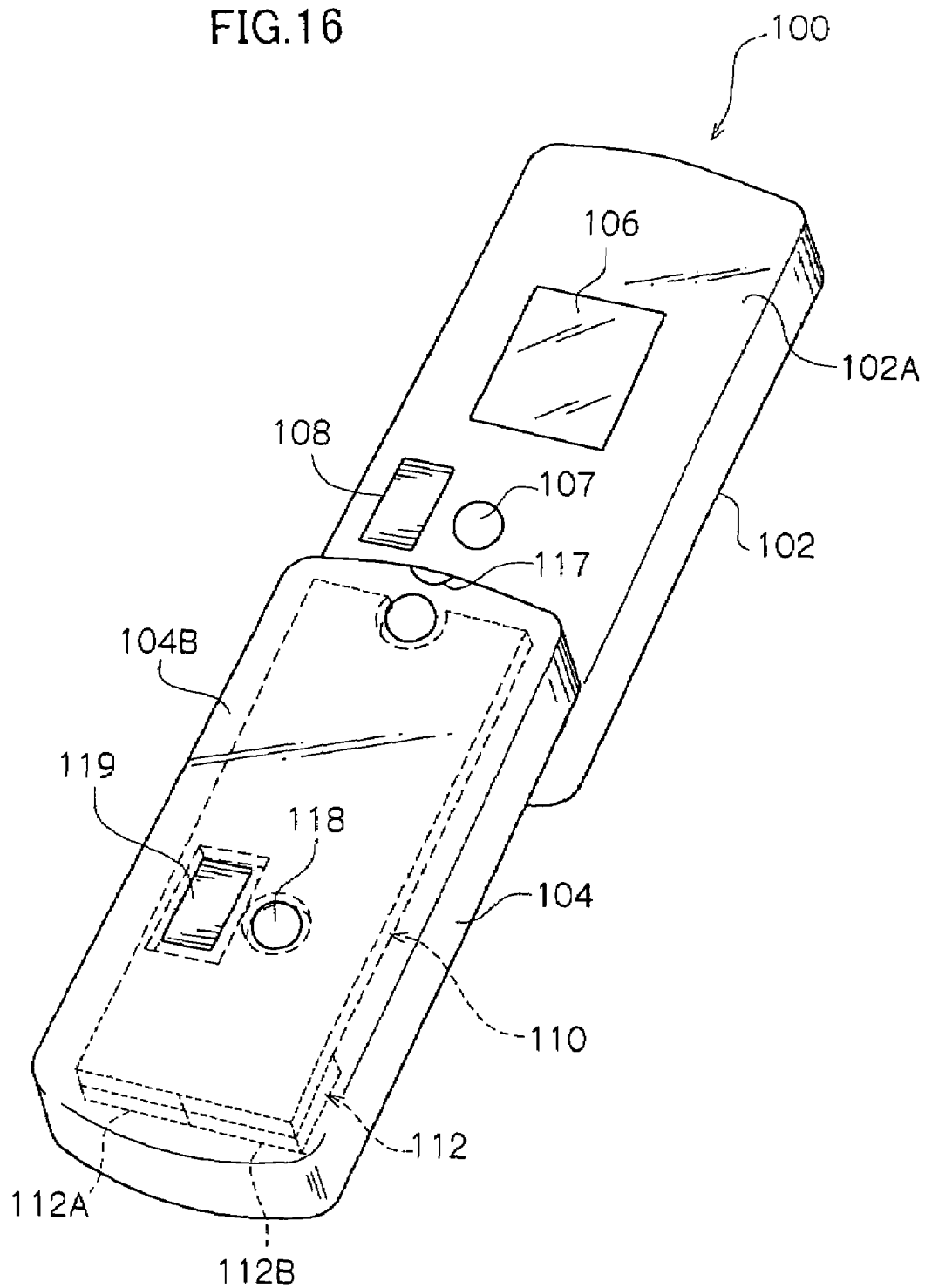
FIG. 16 is a perspective view showing the cellular phone with digital camera of the fifth embodiment of the invention.

As shown in FIGS. 15 and 16, the cellular phone with digital camera 100 is constituted by connecting a first housing 102 having an image monitor 101 etc. and a second housing 104 having a keyboard 103 etc. with a hinge 105. The first housing 102 is arranged so as to be rotatable along a keyboard surface 104A on which the keyboard 103 of the second housing 104 is provided by the hinge 105.

On a first surface 102A of the first housing 102, which faces the keyboard surface 104A when closed, a sub image monitor 106, a first photographing lens 107, and a first electric flash unit 108 are provided, and, on a second surface 102B as a rear surface of the first surface 102A, the image monitor 101 and a speaker 115 are provided. Further, in the first housing 102, a shooting unit (not shown) having at least the first photographing lens 107 and a CCD image pickup device (not shown) is built-in. Furthermore, on a side surface, a first shutter button 116 is provided. A cover 109 is provided on the lower side of the keyboard 103 of the keyboard surface 104A of the second housing 104.

At the bottom of the second housing 104, a fuel cell 110 is disposed in the vicinity of the bottom panel 104B and substantially in parallel with the bottom panel 104B. The fuel cell 110 has the same constitution as that in the first embodiment, and is integrated with the bottom panel 104B. Additionally, since it is highly possible that the cellular phone with digital camera 100 may be dropped by the user during use, it is particularly preferable that a buffer member 19 is provided.

Further, a fuel tank 112 having a double layer structure of a fuel reservoir portion 112A and a water collection portion 112B is charged from above a storage portion 111. In the fuel tank 112, a fuel supply port 115 to be connected to a supply port 113 in a water tight condition is provided so as to face a fuel reservoir portion 112A, and a water collection port 116 to be connected to a drain port 114 in a water tight condition is provided so as to face the water collection portion 112B.

Furthermore, on a side surface of the second housing 104, a second shutter button 113 is provided, and, on a bottom panel 104B of the key board surface 104A, a second photographing lens 118, a second electric flash unit 119, and a microphone 120 are provided.

The cellular phone with digital camera 100 is arranged so as to enable shooting by pressing the first shutter button 116 provided on the side surface of the first housing 102 with the second photographing lens 118 and the second electric flash unit 119 even in a closed condition. Further, the cellular phone with digital camera 100 is arranged so as to enable telephone call with the microphone 120.

In the thus configured cellular phone with digital camera 100 of the fifth embodiment, as well as in the digital still camera 10 of the first embodiment, the fuel cell 110 to be supplied with necessary power from the fuel tank 112 and driven is disposed in the vicinity of the bottom panel 104B of the second housing 104 substantially in parallel with the bottom panel 104B, and thereby, the broader cell area (the area of the proton conducting film 90) can be ensured and the necessary power for driving the cellular phone with digital camera 100 can be ensured reliably. Since the fuel cell 110 is disposed along the bottom panel 104B, upsizing of the cellular phone with digital camera 100 is not caused.

Further, in the fifth embodiment, as similarly as in the second embodiment to the fourth embodiment, the adsorption sheet 96A of the fuel cell 110 is disposed so as to face toward the outside of the second housing 104. Thus, the water produced by the electrochemical reaction in the fuel cell 110 can be discharged efficiently to the outside. In the second housing 104, the portion thereof corresponding to the fuel cell 110 is preferably formed by a mesh member.

In the above description, the digital still camera 10, the silver-halide film cameras 510, 540, and 550, and the cellular phone with digital camera 100 are cited as examples of a portable device of the invention. However, the portable device is not limited thereto. For example, the invention can be applied to any portable device driven by a fuel cell such as a moving picture shooting device capable of shooting moving pictures, a sound reproducing device such as a so-called headphone stereo, a portable game machine, a portable receiving device such as a portable radio, a portable wireless device such as a portable transceiver, a personal digital assistant referred as "PDA", and a cellular phone. Further, the device may be constituted so as to be portable no matter whether the device is used portably or the device is used fixedly in practical use conditions. In any portable device, according to the invention, the catalyst layers 92A and 92B, the carbon papers 94A and 94B, and the adsorption sheets 96A and 96B constituting the fuel cell 16 are disposed integrally with the camera housing as a part thereof, and thereby, the broader cell area, i.e., the area of the proton conducting film 90 can be ensured compared to the conventional one.

In addition, the methanol direct fuel cell has been described, however, the invention can be applied to other kinds of fuel cells such as a proton-exchange membrane fuel cell.

Next, the sixth embodiment of the invention will be described.

Figure 17:
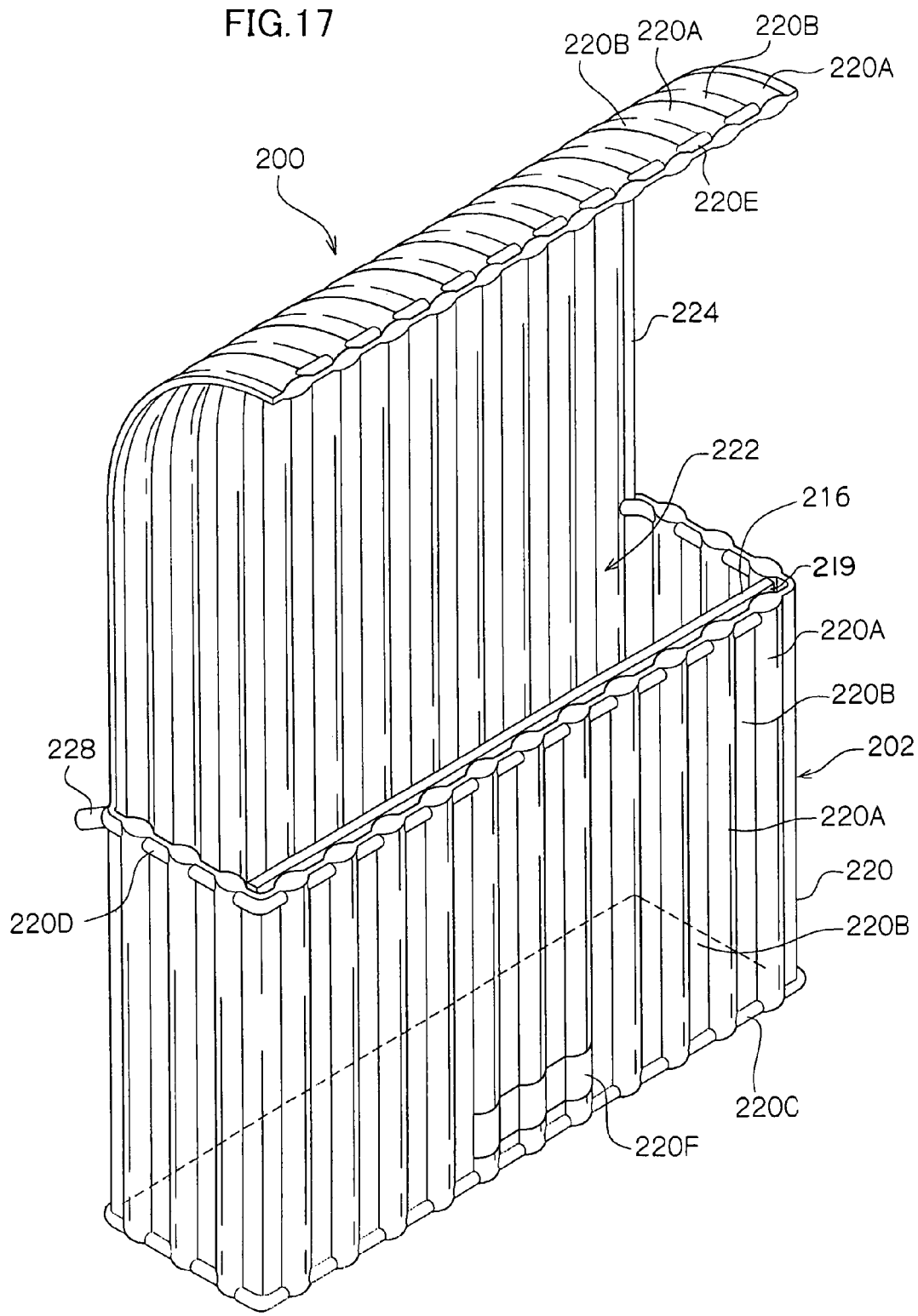
FIG. 17 is a perspective view showing a carrying case of a sixth embodiment of the invention.
Figure 18:
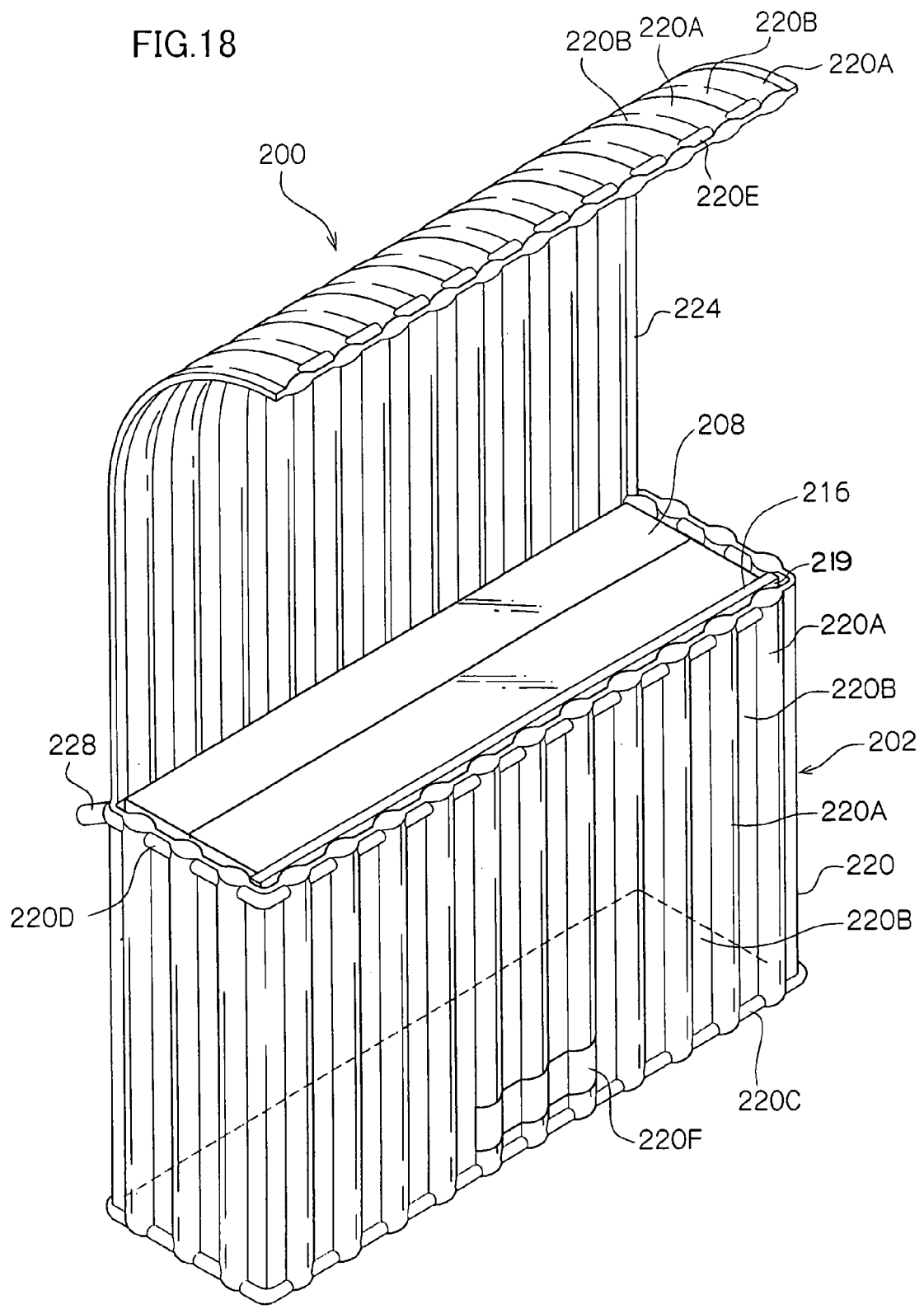
FIG. 18 is a perspective view showing the carrying case of the sixth embodiment of the invention in a state in which a laptop computer is accommodated inside.

As shown in FIGS. 17 and 18, a carrying case 200 according to the embodiment is for accommodating and carrying a notebook computer 208 (or a laptop computer) as a portable device, and has a computer accommodation portion 202 for accommodating the notebook computer or laptop computer.

A side wall of the computer accommodation portion 202 is formed by a side wall portion 220, and, on the upper surface thereof, an opening portion 222 from which the notebook computer or laptop computer is charged is provided.

One of four surfaces of the side wall portion 220 extends further upward and forms a lid portion 224 for covering the opening portion 222.

At the end of the lid portion 224 and the side wall portion 220, a surface fastener 220F for fastening the end of the lid portion 224 to the side wall portion 220 is provided.

The side wall portion 220 is constituted by long fuel bags 220A provided along the vertical direction and seal portions 220B for partitioning adjacent two fuel bags 220A. The side wall portion 220 is formed by folding a soft sheet into two and thermal-fusion bonding the sheet at right angles to the folded portion linearly at constant intervals by thermal fusion. In the thus formed side wall portion 220, the seal portions 220B are formed by the thermal-fusion bonded portions, and the fuel bags 220A are formed by unsealed portions in bag shapes remaining in the thermal-fusion bonded portions. Further, the side wall portion 220 may be formed by laminating a cloth such as nylon on at least one of inner and outer surfaces of the side wall portion 220, or folding a laminated sheet formed by laminating the cloth and the soft sheet into two with the soft sheet inside and thermal-fusion bonding it at right angles to the folded portion linearly at constant intervals. Furthermore, the side wall portion 220 formed by thermal-fusion bonding the soft sheet may be accommodated in another soft case or hard case. The carrying case formed by laminating a cloth on inner and outer surfaces of the side wall portion 220, the carrying case formed by thermal-fusion bonding the laminated sheet to form the side wall portion 220, and the carrying case formed by accommodating the side wall portion 220 in another soft case or hard case are preferable because the fuel bags 220A hardly burst when a great external force or impact is applied thereon.

Inside the computer accommodation portion 202, a fuel cell 216 is disposed integrally with the side wall portion 220 in surface contact in parallel with the front side wall portion 220. Note that, in cases for portable device of the respective embodiments, "substantially in parallel" of the invention is realized by not only the constitution in which the fuel cell is completely in parallel with the corresponding wall body, but also the slightly slanted constitution, and, in the case where the wall body is curved or bent, by the constitution in which the fuel cell 216 is also curved or bent. Further, as the integrally disposed structure, a constitution in which an engaging member such as a claw is engaged with a package (not shown) of the fuel cell 216, or the corresponding panel and a part of the fuel cell 216 (the above described package and the like) may be completely integrated by welding.

Moreover, on the corresponding wall body, a buffer member 219 constituted by rubber, an expandable resin, a spring, or the like is provided between the fuel cell 216 and itself. Due to the buffer member 219, even when an impact acts on the digital still camera 10 due to dropping or the like, the impact transmission to the fuel cell 216 is reduced, and the fuel cell 216 can be protected from the impact.

Figure 5:
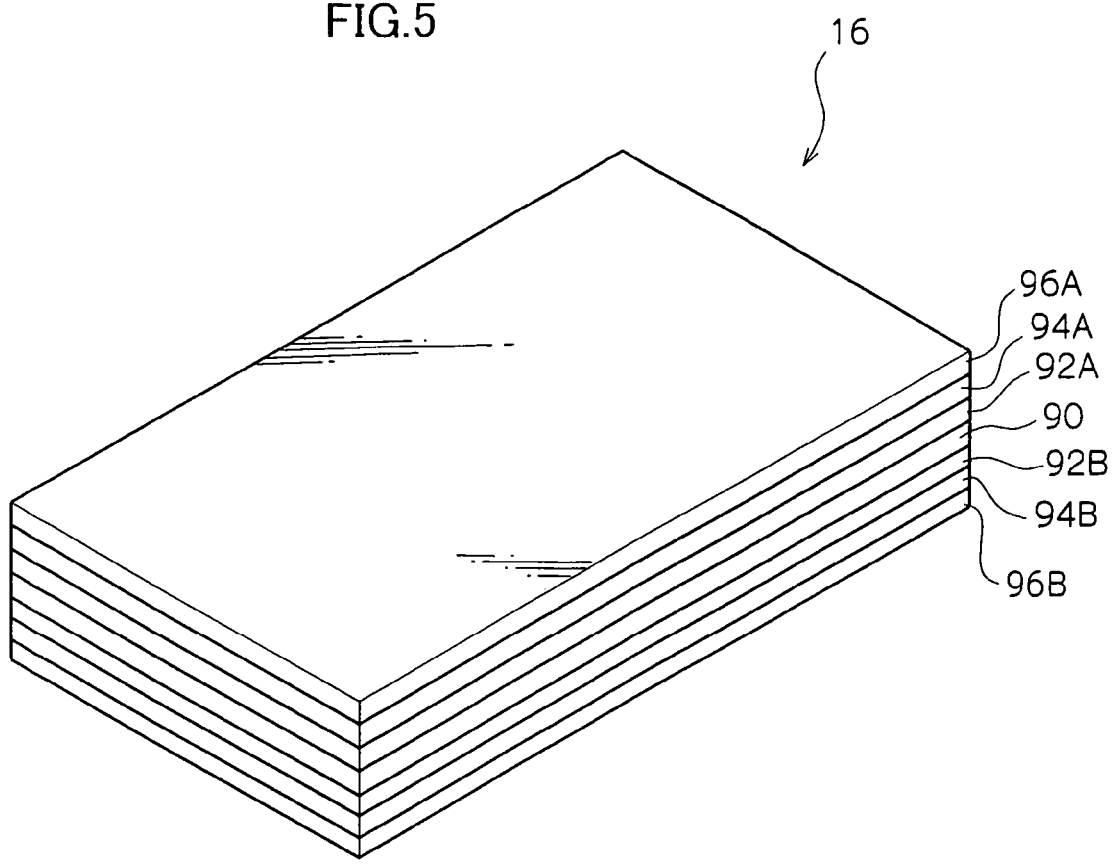
FIG. 5 is a perspective view showing the schematic construction of a fuel cell according to the invention.

The fuel cell 216 has the same layered structure as the fuel cell 16 in the first embodiment (see FIG. 5).

In the side wall portion 220, communication channels 220C for respectively bringing the fuel bags 220A into communication with each other at lower ends thereof, and communication channels 220D for respectively bringing the fuel bags 220A into communication with each other at upper ends thereof are formed. The communication channels 220C and the communication channels 220D may be formed by embedding tubes at upper edges and lower edges of the seal portions 220B, or by forming unsealed portion at upper edges and lower edges of the seal portions 220B to bring the communication between adjacent two fuel bags 220A.

The communication channels 220C communicate with the fuel cell 216 via conduits (not shown) and the fuel within the fuel bags 220A is supplied to the fuel cell 216 from the communication channels 220C via the conduits.

On the other hand, the communication channels 220D communicate with a fuel replenishment valve 228. The fuel replenishment valve 228 is a valve element that opens in a direction from outside toward the communication channels 220D, and closes in the opposite direction.

Furthermore, at the end edges of the lid portion 224, the communication channels 220E for communication of the fuel bags 220A are also provided.

In the fuel cell 216, a power supply terminal (not shown) is provided so as to connect to the notebook computer or laptop computer accommodated in the computer accommodation portion 202 in order to supply power thereto.

In the thus configured carrying case 200 of the sixth embodiment, when the notebook computer 208 is accommodated in the computer accommodation portion 202 and the opening portion 222 is covered by the lid portion 224, the side wall portion 220 of the computer accommodation portion 202 and the lid portion 224 abut the outer surface of the notebook computer 208.

Here, since the side wall portion 220 and the lid portion 224 form a sheet-shaped body formed by connecting the fuel bags 220A with the seal portions 220B in the width direction, and the fuel bags 220A are formed from a soft sheet and accommodates the fuel inside, they function as a cushion. Therefore, the notebook computer 208 accommodated inside is protected from the external force or impact. Further, even in the case of operating the notebook computer 208 outdoors for long hours, there is no need to carry a large amount of fuel in addition to the carrying case 200.

The fuel accommodated within the fuel bags 220A is supplied to the fuel cell 216 through the communication channels 220C and the conduits (not shown), and power is generated with the fuel in the fuel cell 216. Since the fuel cell 216 is disposed in a surface contact manner parallel to the front side wall portion 220 and has a broad cell area, the cell can reliably supply the necessary power to the accommodated notebook computer 208. In addition, since the fuel cell 216 is disposed along the side wall portion 220, upsizing of the carrying case 200 is not caused.

Next, a carrying case 302 of the seventh embodiment of the invention will be described.

Figure 19:
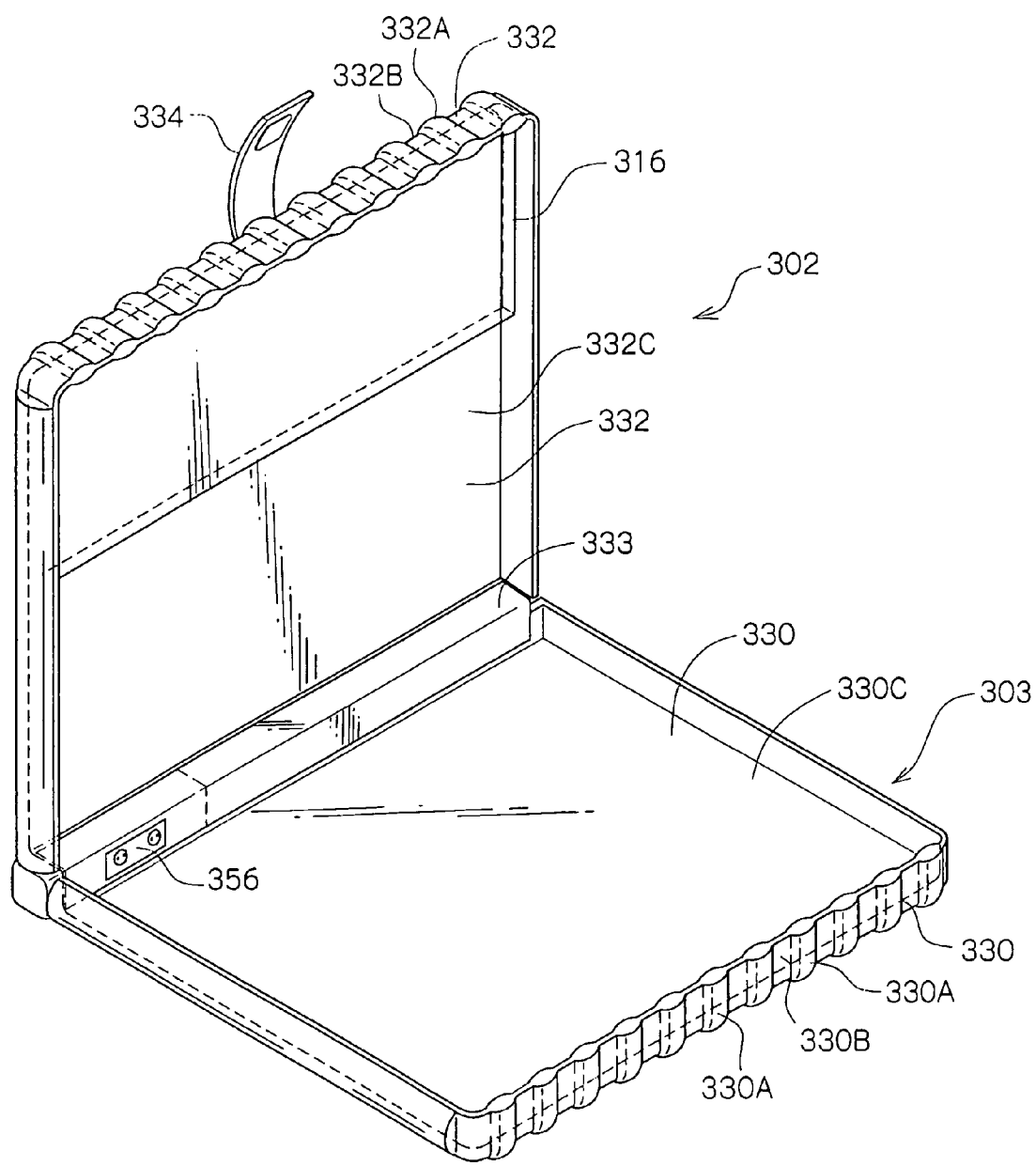
FIG. 19 is a perspective view showing a carrying case of a seventh embodiment of the invention.
Figure 20:
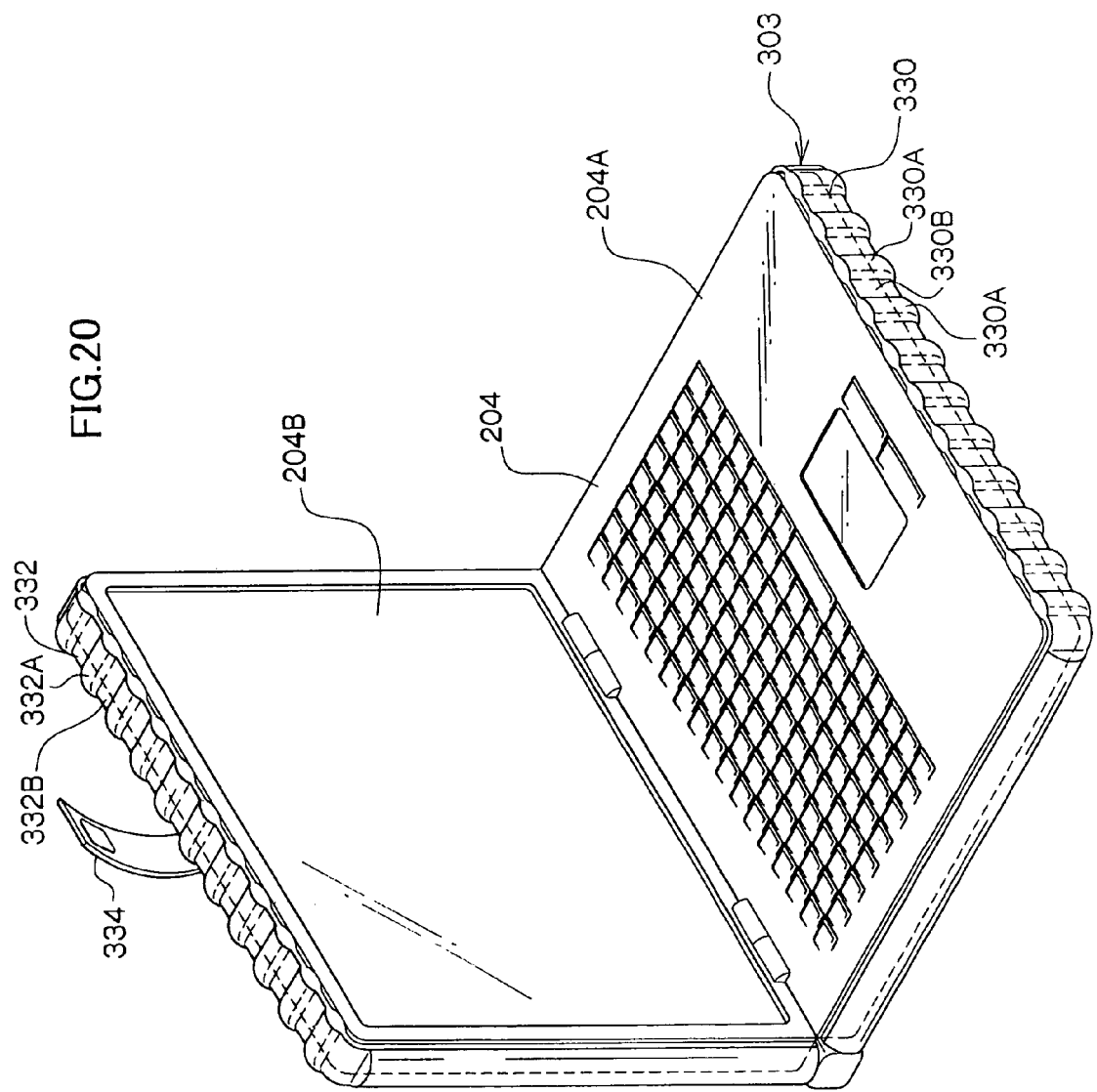
FIG. 20 is a perspective view showing the carrying case of the seventh embodiment of the invention in a state in which a notebook computer is accommodated inside.

As shown in FIGS. 19 and 20, the carrying case 302 according to the seventh embodiment is for accommodating and carrying a notebook computer, as well as the carrying case 200 of the sixth embodiment, and has a computer accommodation portion 303 in a shallow box shape for accommodating the notebook computer 208.

The computer accommodation portion 303 is constituted by a main body accommodation portion 330 for accommodating a main body 208A of the notebook computer 208 and a display accommodation portion 332 for accommodating a display 208B of the notebook computer 208. The main body accommodation portion 330 and the display accommodation portion 332 are connected by a hinge portion 333 made of a flexible tape member, and formed operable and closable relative to each other. Note that, in FIG. 19, a state in which the main body accommodation portion 330 and the display accommodation portion 332 are opened.

The main body accommodation portion 330 has longbag shaped fuel bags 330A disposed in parallel with each other, seal portions 330B for partitioning the adjacent two fuel bags 330A. Similarly, the display accommodation portion 332 has longbag shaped fuel bags 332A disposed in parallel with each other, seal portions 332B for partitioning the adjacent two fuel bags 332A. The fuel bags 330A and the seal portions 330B can be formed by folding a soft sheet into two and providing linear seal portions in parallel with each other along the direction at right angles to the folded portion at constant intervals as well as in the sixth embodiment. The fuel bags 330A are formed by unsealed portions between the seal portions and the seal portions 330B are formed by the seal portions. The display accommodation portion 332 has a similar constitution.

On inner surfaces of the main body accommodation portion 330 and the display accommodation portion 332, linings 330C and 332C can be provided for easily attaching and detaching the notebook computer 208.

In the main body accommodation portion 330, a securing belt 334 for securing the main body accommodation portion 330 to the display accommodation portion 332 when the main body accommodation portion 330 and the display accommodation portion 332 are closed, is provided.

Inside the display accommodation portion 332, a fuel cell 316 is disposed in surface contact with a wall surface (the surface in parallel with the accommodated display) of the display accommodation portion 332. The fuel cell 316 has the same layered structure as in the first embodiment. From the fuel cell 316, power can be supplied to the notebook computer 208 by a power supply terminal 356 via a power supply line (not shown). As shown in FIG. 20, when the main body 208A of the notebook computer 208 is accommodated in the main body accommodation portion 330 and the display 208B of the notebook computer 208 is accommodated in the display accommodation portion 332, the power supply terminal 356 is connected to an external power supply terminal provided in the main body 208A. Therefore, the power generated in the fuel cell 316 is supplied to the notebook computer 208 via a circuit unit 354 and the power supply terminal 356.

In the thus configured carrying case 302 of the seventh embodiment, the computer accommodation portion 303 is also formed operable and closable, and thereby, even when the notebook computer 208 is in a state of being accommodated in the carrying case 302, the computer can be operated by opening the main body 208A and the display 208B.

Further, since a large amount of fuel can be accommodated in fuel bags 330A and fuel bags 332A, there is no need to carry the fuel for driving the fuel cell 316 separately. Furthermore, power generation can also be performed by the fuel cell 316 for a long time. Here, since the notebook computer 208 is driven by the power generated by the fuel cell 316, the computer can be driven for far longer time than in the case of driving it only by the secondary cell accommodated inside.

The fuel accommodated within the fuel bags 330A is supplied to the fuel cell 316, and power required for driving the accommodated notebook computer 208 is generated. Since the fuel cell 316 is disposed in surface contact with the wall surface of the display accommodation portion 332 and has a broad cell area, the power required for the accommodated notebook computer 208 can be supplied reliably. In addition, since the fuel cell 316 is disposed along the wall surface of the display accommodation portion 332, upsizing of the carrying case 302 is not caused.

Heretofore, examples in which the notebook computer 208 is accommodated in the carrying case 302 have been. However, the carrying case 302 can preferably be used for accommodating and carrying a laptop computer.

Next, a carrying case 404 of the eighth embodiment of the invention will be described.

Figure 21:
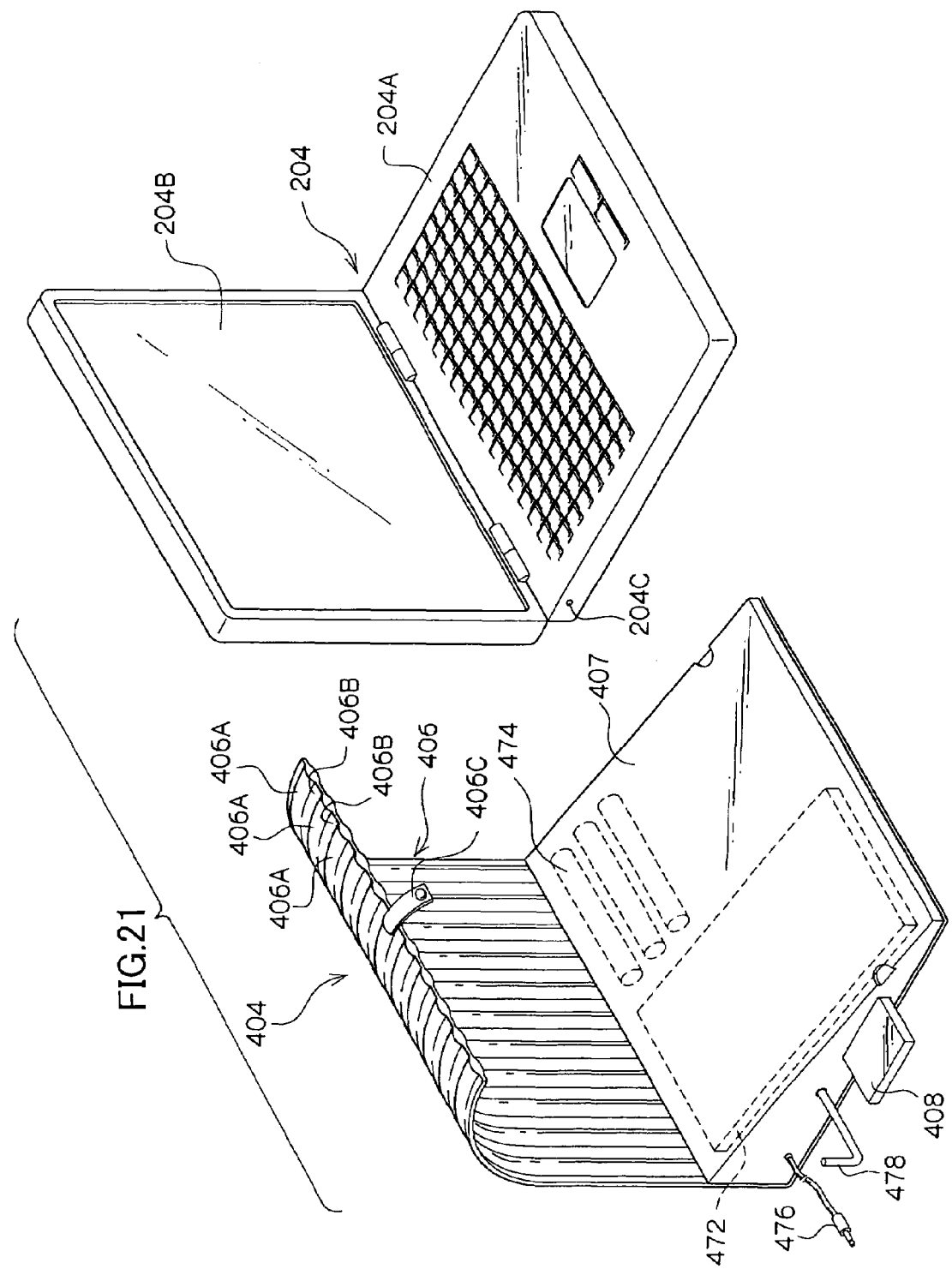
FIG. 21 is a perspective view showing a carrying case of an eighth embodiment of the invention.

As shown in FIG. 21, the carrying case 404 according to the eighth embodiment has a wedge-shaped section, and a base 407 on which a main body 204A of a laptop computer 204 is placed and a cover portion 406 secured at the side edge of the base 407 on the thicker side thereof for covering the laptop computer 204 in a state in which a display 204B and the main body 204A are closed by wrapping it from above.

In the cover portion 406, longbag shaped fuel bags 406A provided along the direction in which the cover portion is wrapped around the laptop computer 204, seal portions 406B for connecting and sealing the adjacent two fuel bags 406A are provided. The cover portion 406 can also be formed by folding a soft sheet into two and providing linear seal portions in parallel with each other along the direction at right angles to the folded portion at constant intervals as well as the side wall portion 220 in the sixth embodiment, the main body accommodation portion 33 and the display accommodation portion 332 in the seventh embodiment. The seal portions 406B are formed by the seal portions and the fuel bags 406A are formed by unsealed portions between the seal portions. In the cover portion 406, a securing belt 406C for securing the cover portion 406 in a state of covering the laptop computer 204 is further provided. The securing belt 406C is secured on the rear surface of the base 407 by a snap.

Inside the base 407, a fuel cell 472 and a secondary cell 474 to be charged by the fuel cell 472 are provided. The fuel cell 472 has the same layered structure as in the first embodiment. The fuel cell 472 is disposed in the vicinity of the upper surface of the base 407 in parallel with the upper surface. Further, a fuel supply channel (not shown) is provided between the fuel bags 406A and the fuel cell 472. In the base 407, a slot for inserting a PC card 408 therein is further provided, and a power supply cord 476 for supplying the power from the fuel cell 472 and the secondary cell 474 to the laptop computer 204 and a wireless LAN antenna 478 for transmitting data to and receiving data from an external computer are provided. The external power supply cord 476 is connectable to an external power supply terminal 204C of the laptop computer 204.

When accommodating the laptop computer 204 in the carrying case 404 of the eighth embodiment, first, the laptop computer 204 is placed on the base 407. Thereby, the external output terminal of the laptop computer 204 is connected to the data input terminal of the base 407. After placing the laptop computer 204 on the base 407, the cover portion 406 is wrapped around the laptop computer 204 from above to be secured. Then, the power supply cord 476 is connected to the external power supply terminal 204C of the laptop computer 204 so that the power generated in the fuel cell 472 may be supplied to the laptop computer 204.

Here, in the fuel cell 472, the power generation is performed with the fuel fed from the fuel bags 406A through the fuel supply channel to generate power. This power is used for charging the secondary cell 474 and supplied to the laptop computer 204 via the power supply cord 476.

Further, since the fuel cell 472 is disposed in the vicinity of the upper surface of the base 407 in parallel with the upper surface and has a broad cell area, the power required for driving the laptop computer 204 can be supplied reliably. In addition, since the fuel cell 472 is disposed along the upper surface of the base 407, upsizing of the carrying case 204 is not caused.

In the carrying case 404, the laptop computer 204 placed on the base 407 is secured so as not to be dropped on the base 407 by being wrapped around with the cover portion 406. Further, the computer is protected from the external impact by the fuel bags 406A provided in the cover portion 406.

Furthermore, since the laptop computer 204 is driven by the power generated by the fuel cell 472 and the secondary cell 474, the computer can be driven in far longer hours than in the case of driving it only by the secondary cell accommodated inside the laptop computer 204.

As described above, in any one of the carrying cases (cases for portable device) according to the respective embodiments of the invention, the catalyst layers 92A and 92B, the carbon papers 94A and 94B, and the adsorption sheets 96A and 96B constituting the fuel cell 16 are disposed integrally with the case housing as a part thereof, and thereby, the cell area, i.e., the area of the proton conducting film 90 can be ensured broader compared to the conventional one.

In the carrying cases of the respective embodiments, it is more preferable that the fuel cell 16 is disposed by being folded along plural surfaces of the case housing compared to the constitution in which the fuel cell 16 is disposed in a planar shape because the area of the proton conducting film 90 can be ensured broader.

Further, in the carrying cases of the respective embodiments, it is preferred that the adsorption sheet 96A of the fuel cell 16 is disposed so as to face toward the outside of the case housing in order to discharge the water produced by the electrochemical reaction efficiently to the outside. Furthermore, the portion corresponding to the fuel cell 16 in the case housing is preferably formed by a mesh member.

Figure 22:
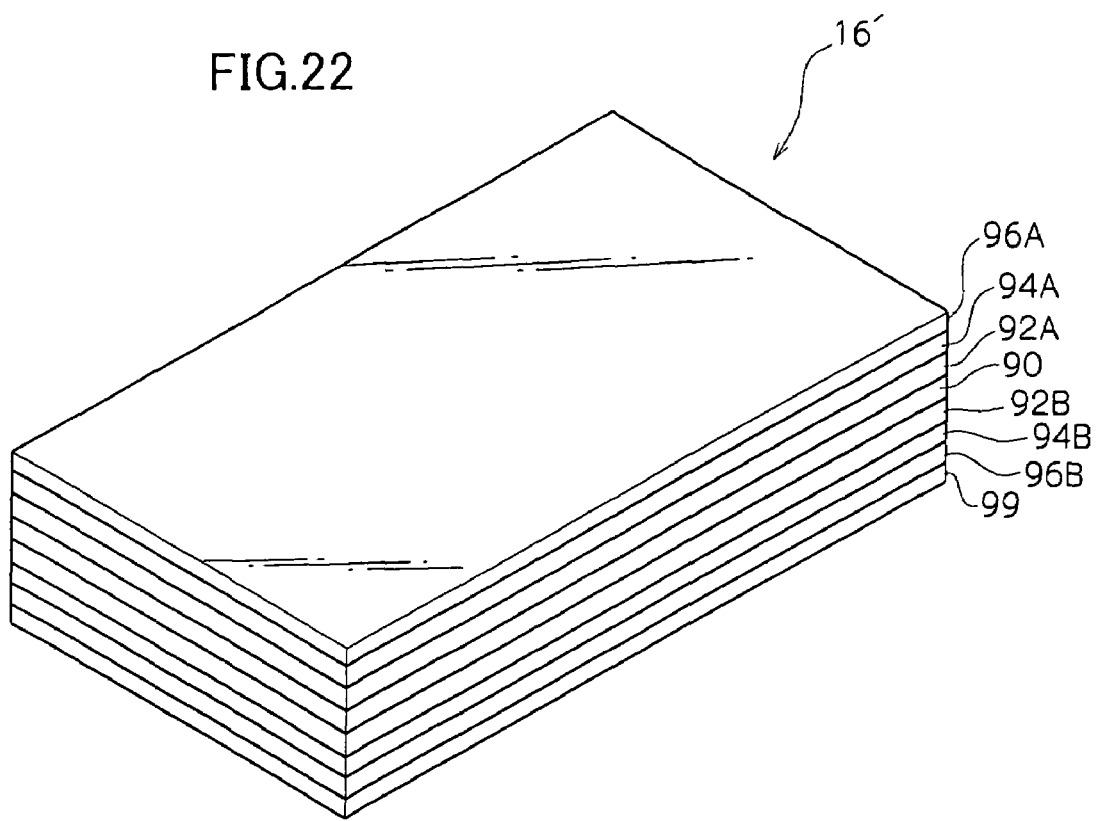
FIG. 22 is a perspective view showing another example of the fuel cell according to the invention, which is different from the one shown in FIG. 5.

Incidentally, the fuel cell of the invention is not limited to the layered structure (see FIG. 5), and a structure shown in FIG. 22, for example, may be adopted. The basic structure of a fuel cell 16' is the same as that of the fuel cell 16. However, in the adsorption sheet 96B, a carbon dioxide adsorption layer 99 having high adsorbability of carbon dioxide is further provided. Therefore, the carbon dioxide generated in the fuel cell 16' can be prevented from leaking outside by allowing the carbon dioxide to be adsorbed by the carbon dioxide adsorption layer 99. As the carbon dioxide adsorption layer 99, for example, lithium zirconate which is advantageous in reactivity with carbon dioxide can be used. By the carbon dioxide adsorption layer 99 using this lithium zirconate, chemical reaction occurs when it contacts the gas including carbon dioxide in a range of temperature of 450 to 700° C. and carbon dioxide 400 times in volume rate can be absorbed.

In a constitution using any fuel cell, it is preferred that reaction suppressing portion may be provided in order that the electrochemical reaction in the fuel cell 16 is suppressed to reduce the amount of generated power, and thus, the wasteful fuel consumption can be suppressed and the overcharge of the secondary cell 51 can be prevented. Especially, in the carrying cases (cases for portable device) of the respective embodiments, by adopting the constitution in which a flow rate regulating valve 23 is provided in the tube 21 for supplying the fuel from each carrying case to the fuel cell 16 (see FIG. 8), or a flow rate regulating valve 59 is provided in the tube 57 for supplying the air to the fuel cell 16 (see FIG. 10), the electrochemical reaction in the fuel cell 16 is suppressed to reduce the amount of generated power, and thus, the wasteful fuel consumption can be suppressed and the overcharge of the secondary cell 51 can be prevented.

What is claimed is:

1. A portable device including a fuel cell, the device comprising:
    a device housing having a plurality of outer walls;
    a proton conducting film which is disposed inside, and extends on and substantially parallel to at least one of said outer walls of, the device housing;
    catalyst layers disposed inside said device housing and on both sides of the proton conducting film in a thickness direction thereof;
    a removable fuel tank which is located inside said device housing in a storage portion (14) thereof having an opening for insertion of only the fuel tank, and which is physically separate from said proton conducting film;
    fuel of the fuel cell disposed on one of the catalyst layer sides of the proton conducting film; and
    an air chamber disposed inside said device housing and on the other of the catalyst layer sides of the proton conducting film for supplying air to the fuel cell,
    so that the fuel tank can be inserted and exchanged through said opening without disassembling of said device housing.

2. A portable device according to claim 1, wherein one of said outer walls forms a bottom surface of the device housing.

3. A portable device according to claim 1, wherein component parts of the portable device are disposed, and the proton conducting film is disposed, at least in an air space within the device housing.

4. A portable device according to claim 1, wherein the proton conducting film is disposed so as to be folded inside the device housing.

5. A portable device according to claim 1, wherein the air chamber is disposed so as to face the outside of the device housing.

6. A portable device according to claim 5, wherein, in the device housing, at least a portion located outside of the air chamber is formed by a mesh member.

7. A portable device according to claim 1, wherein at least one of said outer walls of said device housing has a buffer member located between the fuel cell and the one outer wall.

8. A portable device according to claim 1 further comprising a grip portion that can be held by a user,
    wherein the proton conducting film is disposed along the grip portion.

9. A portable device according to claim 1, wherein one of the outer walls of said device housing is a lid member that makes a part of the device housing openable and closable,
    wherein the proton conducting film is disposed on and along the lid member.

10. A portable device according to claim 1 further comprising a substrate therein,
    wherein at least a part of the proton conducting film is disposed between the one outer wall of the device housing and the substrate.

11. A portable device according to claim 10, wherein the proton conducting film is folded back so as to be disposed along both sides of the substrate.

12. A portable device according to claim 10, wherein the substrate is a circuit board constituting auxiliary light emitting portion.

13. A portable device according to claim 1 further comprising reaction suppressing portion for suppressing an electrochemical reaction in the fuel cell provided in the portable device.

14. A portable device according to claim 13, wherein the reaction suppressing portion suppresses the electrochemical reaction by adjusting a voltage applied to the fuel cell.

15. A case for a portable device capable of accommodating therein a portable device having a fuel cell as a power source, the case comprising:
    a case housing;
    a proton conducting film which is disposed inside said case housing on and substantially parallel to a wall body of the case housing;
    catalyst layers disposed inside said case housing and on both sides of the proton conducting film in a thickness direction thereof;
    a removable fuel tank which is located in said case housing in a storage portion (14) thereof having an opening for insertion of only the fuel tank, and which is physically separate from said proton conducting film;
    fuel of the fuel cell disposed on one of the catalyst layer sides of the proton conducting film; and
    an air chamber disposed inside said case housing and on the other of the catalyst layer sides of the proton conducting film for supplying air to the fuel cell,
    so that the fuel tank can be inserted and exchanged through said opening without disassembling of said case housing.

16. A case for a portable device according to claim 15, wherein the proton conducting film is disposed so as to be folded along the case housing.

17. A case for a portable device according to claim 15, wherein the air chamber is disposed so as to face the outside of the case housing.

18. A case for a portable device according to claim 15, wherein, in the case housing, at least a portion located outside of the air chamber is formed by a mesh member.

19. A case for a portable device according to claim 15, wherein the wall body has a buffer member located between the fuel cell and the wall body.

20. A case for a portable device according to claim 15 further comprising a reaction suppressing portion for suppressing an electrochemical reaction in the fuel cell provided in the case for a portable device.

21. A case for portable device according to claim 20, wherein the reaction suppressing portion suppresses the electrochemical reaction by adjusting a voltage applied to the fuel cell.

22. A portable device according to claim 1, wherein each outer wall of said device housing has a shape and size, and wherein there is on each outer wall a proton conducting film which is substantially co-extensive therewith and has a shape and size which are substantially the same as those of said each outer wall of said device housing.

* * * * *